US00RE50542E

(19) United States
(12) Reissued Patent
Kim et al.

(10) Patent Number: US RE50,542 E
(45) Date of Reissued Patent: *Aug. 19, 2025

(54) MOBILE TERMINAL HAVING TWO CAMERAS AND METHOD FOR STORING IMAGES TAKEN BY TWO CAMERAS

(71) Applicant: LG ELECTRONICS INC., Seoul (KR)

(72) Inventors: Sungjin Kim, Seoul (KR); Yunmi Kwon, Seoul (KR); Kiseon Lee, Seoul (KR); Taehyeong Kim, Seoul (KR)

(73) Assignee: LG ELECTRONICS INC., Seoul (KR)

( * ) Notice: This patent is subject to a terminal disclaimer.

(21) Appl. No.: 17/962,948

(22) Filed: Oct. 10, 2022

Related U.S. Patent Documents

Reissue of:
(64) Patent No.: 10,091,429
Issued: Oct. 2, 2018
Appl. No.: 15/662,172
Filed: Jul. 27, 2017

U.S. Applications:
(63) Continuation of application No. 17/061,568, filed on Oct. 1, 2020, now Pat. No. Re. 49,245, which is an
(Continued)

(30) Foreign Application Priority Data

Jul. 21, 2015 (KR) ..... 10-2015-0103033
Jul. 22, 2015 (KR) ..... 10-2015-0103755

(51) Int. Cl.
*H04N 23/63* (2023.01)
*G03B 37/04* (2021.01)
(Continued)

(52) U.S. Cl.
CPC ..... *H04N 23/635* (2023.01); *G03B 37/04* (2013.01); *G06F 3/0412* (2013.01);
(Continued)

(58) Field of Classification Search
CPC ..... G03B 2205/0046; G03B 37/04; G06F 3/0412; G06F 3/0416; G06F 3/0488;
(Continued)

(56) References Cited

U.S. PATENT DOCUMENTS 9,185,291 B1 11/2015 Shabtay et al.
10,091,429 B2 10/2018 Kim et al.
(Continued)

FOREIGN PATENT DOCUMENTS

EP 2747413 6/2014
JP 2001111976 4/2001
(Continued)

OTHER PUBLICATIONS

United States Patent and Trademark Office U.S. Appl. No. 15/662,172, Office Action dated Sep. 21, 2017, 23 pages.
(Continued)

*Primary Examiner* — Peng Ke
(74) *Attorney, Agent, or Firm* — LEE, HONG, DEGERMAN, KANG & WAIMEY

(57) ABSTRACT

A mobile terminal includes a memory; a touch screen; a first camera having a first capturing angle; a second camera having a second capturing angle that is wider than the first capturing angle; and a controller. The controller is configured to: cause the touch screen to display a first preview image of the first camera, a second preview image of the second camera, or both the first and second preview images overlapping each other; cause the memory to store a first image taken by the first camera in response to a first capture command received while the first preview image is displayed; and cause the memory to store both the first image and a second image taken by the second camera when a wide-angle capturing condition is satisfied while at least one
(Continued)

of the first preview image or the second preview image is displayed.

21 Claims, 23 Drawing Sheets

Related U.S. Application Data application for the reissue of Pat. No. 10,091,429, which is a continuation of application No. 14/868,218, filed on Sep. 28, 2015, now Pat. No. 9,749,543.

(51) Int. Cl.

| | |
|---|---|
| ***G06F 3/041*** | (2006.01) |
| ***G06F 3/0488*** | (2022.01) |
| ***H04M 1/02*** | (2006.01) |
| ***H04N 13/161*** | (2018.01) |
| ***H04N 13/239*** | (2018.01) |
| ***H04N 23/45*** | (2023.01) |
| ***H04N 23/61*** | (2023.01) |
| ***H04N 23/611*** | (2023.01) |
| ***H04N 23/62*** | (2023.01) |
| ***H04N 23/667*** | (2023.01) |
| ***H04N 23/69*** | (2023.01) |

(52) U.S. Cl.

CPC ..... *G06F 3/0416* (2013.01); *G06F 3/0488* (2013.01); *H04M 1/0264* (2013.01); *H04N 13/161* (2018.05); *H04N 13/239* (2018.05); *H04N 23/45* (2023.01); *H04N 23/611* (2023.01); *H04N 23/62* (2023.01); *H04N 23/632* (2023.01); *H04N 23/667* (2023.01); *H04N 23/69* (2023.01); *G03B 2205/0046* (2013.01); *H04N 23/61* (2023.01)

(58) Field of Classification Search

CPC . H04M 1/0264; H04N 13/161; H04N 13/239; H04N 23/45; H04N 23/61; H04N 23/611; H04N 23/62; H04N 23/632; H04N 23/635; H04N 23/667; H04N 23/69

See application file for complete search history.

(56) References Cited

U.S. PATENT DOCUMENTS

| | | | | |
|---|---|---|---|---|
| 10,777,075 | B2 * | 9/2020 | Carlsson | G07B 15/063 |
| RE49,245 | E | 10/2022 | Kim et al. | |
| 2007/0146503 | A1 * | 6/2007 | Shiraki | H04N 3/1593 348/231.3 |
| 2007/0285550 | A1 * | 12/2007 | Son | H04N 5/232 348/335 |
| 2008/0030592 | A1 | 2/2008 | Border et al. | |
| 2011/0164105 | A1 | 7/2011 | Lee et al. | |
| 2012/0038747 | A1 | 2/2012 | Kim et al. | |
| 2013/0162782 | A1 | 6/2013 | Kuo et al. | |
| 2013/0321340 | A1 * | 12/2013 | Seo | G06F 3/0486 345/174 |
| 2015/0015741 | A1 | 1/2015 | Kim et al. | |
| 2015/0077580 | A1 * | 3/2015 | Kim | H04N 23/698 348/211.1 |
| 2015/0085083 | A1 | 3/2015 | Chen et al. | |
| 2015/0163400 | A1 | 6/2015 | Geiss et al. | |
| 2015/0207970 | A1 | 7/2015 | Min et al. | |
| 2017/0026582 | A1 | 1/2017 | Kim et al. | |
| 2017/0347035 | A1 | 11/2017 | Kim et al. | |

FOREIGN PATENT DOCUMENTS

| | | | |
|---|---|---|---|
| JP | 2001111976 | A | 4/2001 |
| JP | 2005101874 | | 4/2005 |
| JP | 2005101874 | A | 4/2005 |
| JP | 2011229116 | | 11/2011 |
| JP | 2011229116 | A | 11/2011 |
| KR | 20100050759 | | 5/2010 |
| KR | 20110059286 | | 6/2011 |
| KR | 20120021762 | | 3/2012 |
| KR | 20150022350 | | 3/2015 |

OTHER PUBLICATIONS

United States Patent and Trademark Office U.S. Appl. No. 17/061,569, Office Action dated Jan. 14, 2022, 20 pages.

Korean Intellectual Property Office Application No. 10-2015-0103755, Notice of Allowance dated Feb. 3, 2017, 1 pages.

European Patent Application No. 16158524.5, Search Report dated Nov. 25, 2016, 9 pages.

Korean Intellectual Property Office Application No. 10-2015-0103033, Notice of Allowance dated May 19, 2016, 3 pages.

* cited by examiner

MOBILE TERMINAL HAVING TWO CAMERAS AND METHOD FOR STORING IMAGES TAKEN BY TWO CAMERAS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a continuation reissue application of U.S. Reissue application Ser. No. 17/061,569, filed Oct. 1, 2020, which is a reissue of U.S. Pat. No. 10,091,429 B2, which issued on Oct. 2, 2018, from U.S. patent application Ser. No. 15/662,172, filed on Jul. 27, 2017, which* is a continuation of U.S. patent application No. 14/868,218, filed on Sep. 28, 2015, now U.S. Pat. No. 9,749,543, which claims the benefit of earlier filing date and right of priority to Korean Patent Application No. [10-20150103033] *10-2015-0103033*, filed on Jul. 21, 2015 and 10-2015-0103755, filed on Jul. 22, 2015, the contents of which are all hereby incorporated by reference herein in their entirety.

BACKGROUND OF THE INVENTION

Field of the Invention

The present invention relates to a mobile terminal enabling a user to more conveniently use the mobile terminal and a method of controlling the mobile terminal.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, a study on a mobile terminal on which both a normal camera and a wide angle camera are mounted is in progress. The wide angle camera corresponds to a camera equipped with a wide-angle lens of which a focal length is much shorter than a focal length of a normal camera. If this type of wide-angle lens is used, since more scenes can be captured in a picture, it is useful for a photographer who is unable to capture a scene from farther to take a picture of architecture, interior design or landscape. Hence, it is required to have a control method appropriate for controlling the mobile terminal on which the two cameras are mounted at the same time.

SUMMARY OF THE INVENTION

Accordingly, an object of the present invention is to address the above-noted and other problems.

Another object of the present invention is to provide a mobile terminal automatically determining a condition appropriate for capturing a picture with a wide angle and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal includes: a memory; a touch screen; a first camera having a first capturing angle; a second camera having a second capturing angle that is wider than the first capturing angle; and a controller configured to: cause the touch screen to display a first preview image of the first camera, a second preview image of the second camera, or both the first and second preview images overlapping each other; cause the memory to store a first image taken by the first camera in response to a first capture command received while the first preview image is displayed; and cause the memory to store both the first image and a second image taken by the second camera when a wide-angle capturing condition is satisfied while at least one of the first preview image or the second preview image is displayed.

To further achieve these objects and other advantages and in accordance with the purpose of the invention, as embodied and broadly described herein, according to another embodiment, a method for controlling a mobile terminal, which includes a first camera having a first capturing angle and a second camera having a second capturing angle that is wider than the first capturing angle, includes: displaying, on a touch screen, a first preview image of the first camera, a second preview image of the second camera, or both the first and second preview images overlapping each other; storing, in a memory, a first image taken by the first camera in response to a first capture command received while the first preview image is displayed; and storing, in the memory, both the first image and a second image taken by the second camera when a wide-angle capturing condition is satisfied while at least one of the first preview image or the second preview image is displayed.

To further achieve these objects and other advantages and in accordance with the purpose of the invention, as embodied and broadly described herein, according to yet another embodiment, a mobile terminal includes: a first camera having a first capturing angle; a second camera having a second capturing angle that is wider than the first capturing angle; and a controller configured to select a normal capturing mode using the first camera or a wide-angle capturing mode using the second camera based on a distance between the first or second camera and a subject to be captured via the first or second camera.

To further achieve these objects and other advantages and in accordance with the purpose of the invention, as embodied and broadly described herein, according to yet another embodiment, a method for controlling a mobile terminal, which includes a first camera having a first capturing angle and a second camera having a second capturing angle that is wider than the first capturing angle, includes: measuring a distance between the first or second camera and a subject to be captured via the first or second camera; and switching a mode between a normal capturing mode using the first camera and a wide-angle capturing mode using the second camera based on the measured distance.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 5A and 5B are conceptual diagrams for a picture with which a normal image 401 including a subject of people and a wide-angle image 402 are overlapped;

FIGS. 6A and 6B are conceptual diagrams for a picture with which a normal image 401 and a wide-angle image 402 are overlapped;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
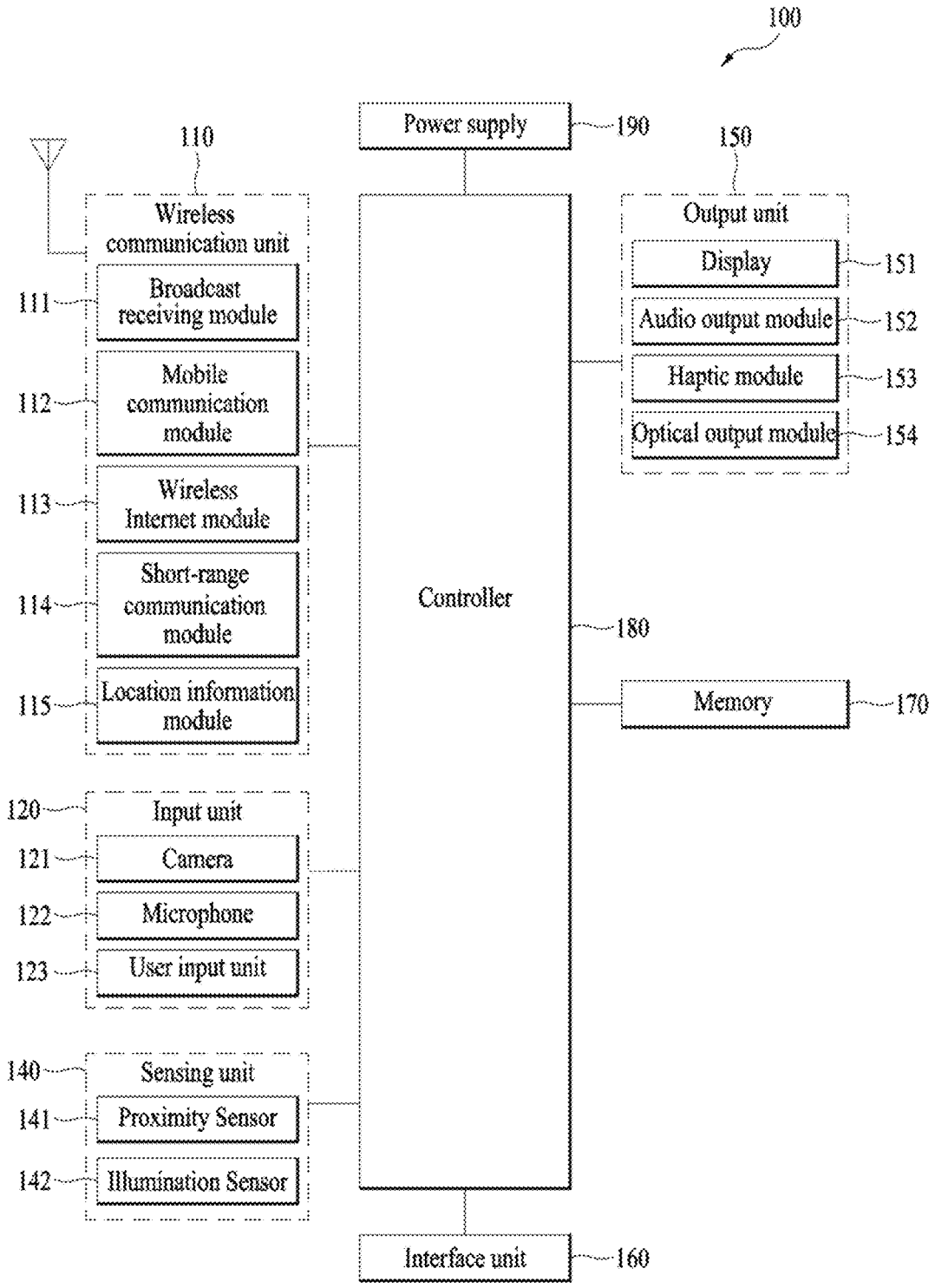
FIG. 1A is a block diagram of a mobile terminal in accordance with the present disclosure.
Figure 1B:
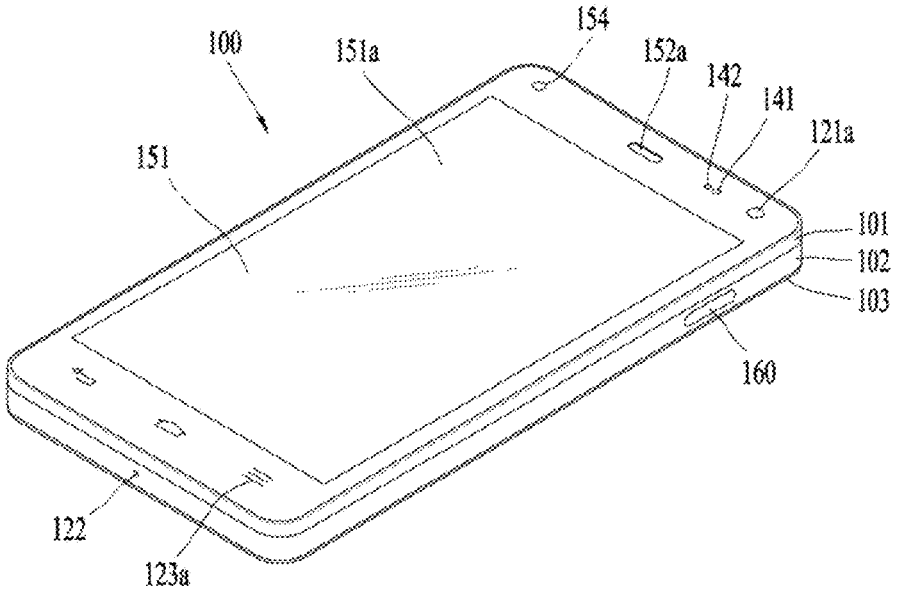
FIGS. 1B and 1C are conceptual views of one example of the mobile terminal, viewed from different directions.
Figure 1C:
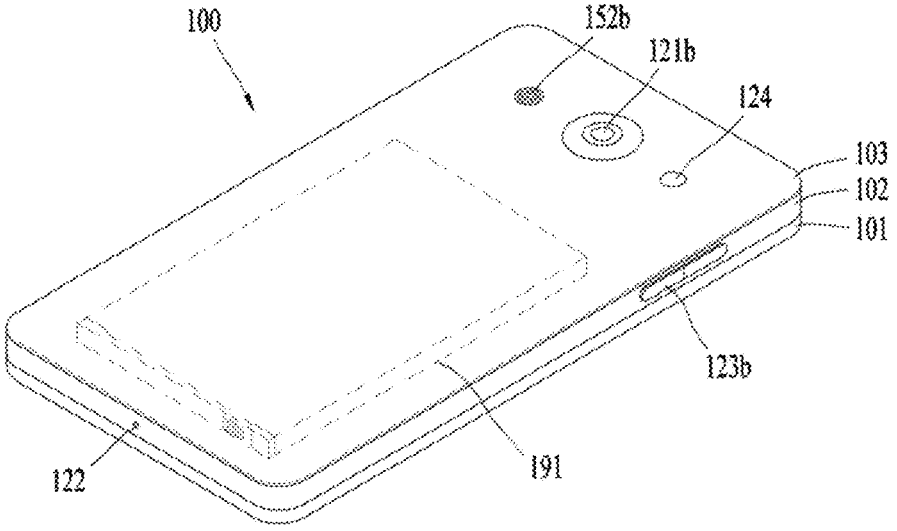

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

A system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical location information module 115 such as a GPS module can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 2:
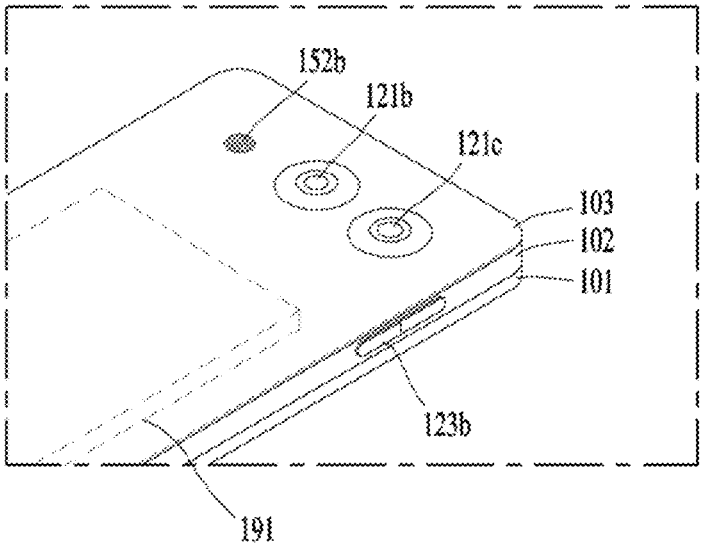
FIG. 2 is a rear view diagram for a different example of a mobile terminal according to one embodiment of the present invention.

FIG. 2 is a rear view diagram for a different example of a mobile terminal according to one embodiment of the present invention.

Assume that a second camera 121b corresponds to a normal camera of a normal capturing angle and a third camera 121c corresponds to a wide angle camera of a wide capturing angle that is wider than the normal capturing angle of the second camera 121b.

A wide angle camera may correspond to a camera equipped with a wide-angle lens of which a focal length is much shorter than a focal length of a normal camera. Although the focal length is relatively very short, since the wide angle camera can capture a picture with a wider capturing angle, the wide angle camera may have an effect of capturing a picture from farther. Hence, usability of the wide angle camera is high.

As shown in the FIG. 2, the second camera 121b and the third camera 121c can be arranged at one side of a mobile terminal 100 in a manner of being adjacent to each other. Although FIG. 2 shows an example that the cameras are arranged at the rear side of the mobile terminal 100, the normal camera and the wide angle camera can be arranged at the front side of the mobile terminal 100 in a manner of being adjacent to each other. Or, the normal camera and the wide angle camera can be arranged at the front side and the rear side, respectively, in a manner of being adjacent to each other.

Images, which are received from the normal camera and the wide angle camera arranged in a manner of being adjacent to each other, can be partially overlapped with each other or one image can be completely included in another image. One exemplary embodiment of the present invention explains a case that a normal image received from the normal camera is included in a wide-angle image received from the wide angle camera, by which the present invention may be non-limited. Embodiments of the present invention can also be applied to a case that the images are partially overlapped.

As mentioned in the foregoing description, when the normal camera and the wide angle camera are arranged in a manner of being adjacent to each other, one embodiment of the present invention intends to propose a control method of efficiently utilizing each of the cameras.

Figure 3A:
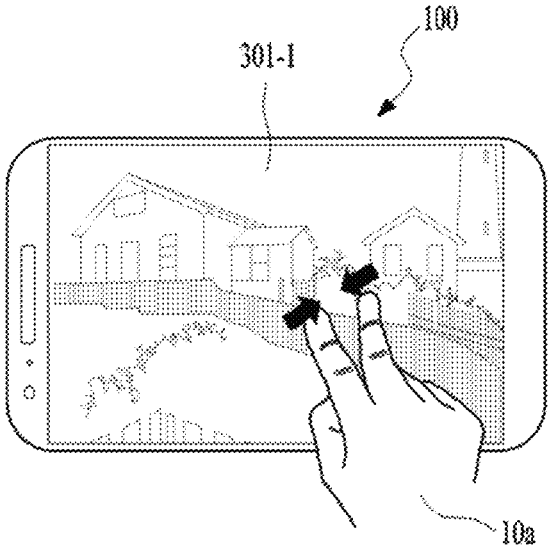
FIGS. 3A-3C are diagrams for a control method of easily switching a mode between a wide-angle mode for capturing a picture using a wide angle camera and a normal mode for capturing a picture using a normal camera according to one embodiment of the present invention.
Figure 3B:
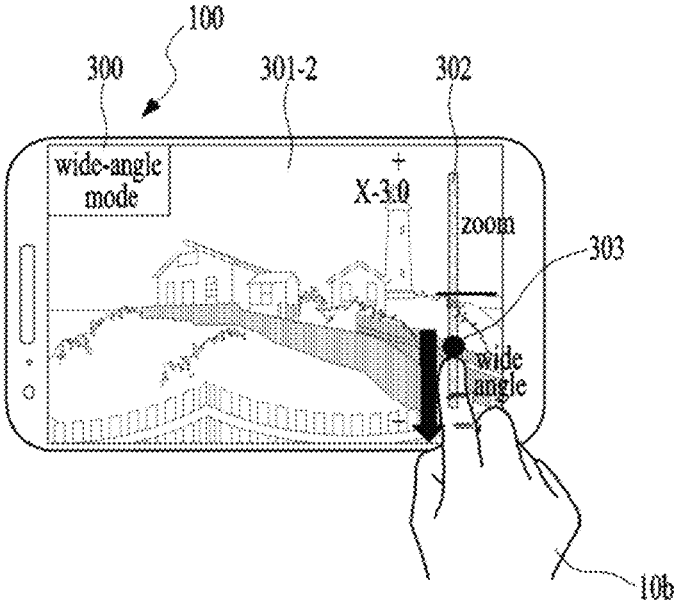
Figure 3C:
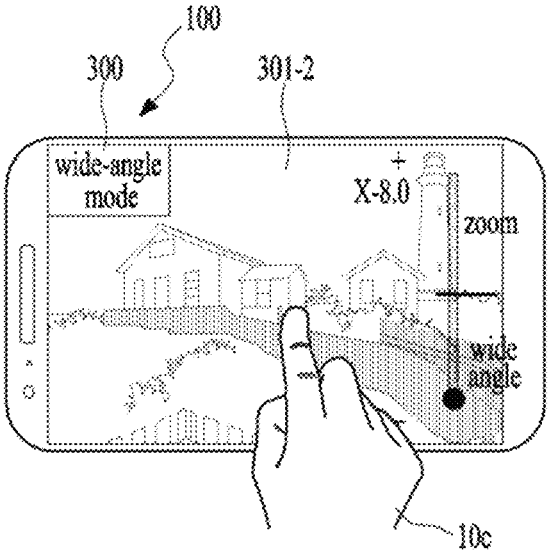

FIGS. 3A-3C are diagrams for a control method of easily switching a mode between a wide-angle mode for capturing a picture using a wide angle camera and a normal mode for capturing a picture using a normal camera according to one embodiment of the present invention.

Referring to FIG. 3A, a normal preview image 301-1 of a second camera 121b, which is a normal camera, is outputted. In this case, if a capture command is received, the controller 180 can store an image received through the second camera 121b in the memory 170. In the following, a series of operations of storing an image received through a camera in the memory 170 is called capturing in one embodiment of the present invention.

One embodiment of the present invention proposes switching a mode to a wide-angle mode based on a specific gesture.

In general, if a pinch-in gesture is received on a preview image, the controller 180 is configured to zoom out a camera. On the contrary, if a pinch-out gesture is received on a preview image, the controller 180 is configured to zoom in a camera.

If a pinch-in gesture 10a is received in a state that a preview image is maximally zoomed out, one embodiment of the present invention proposes switching a capturing mode into a wide-angle mode from a normal mode.

If a normal preview image 301-1 shown in FIG. 3A corresponds to a screen in a state of being maximally zoomed out, as shown in FIG. 3B, the controller 180 can switch a capturing mode into a wide-angle mode in response to an input of a pinch-in gesture 10a. In particular, the controller 180 outputs a wide-angle preview image 301-2 of a wide angle camera instead of the normal preview image 301-1 of a normal camera in a manner of switching the preview images with each other. In this case, the controller 180 can output a wide-angle mode indicator 300 to indicate that a mode is switched to the wide-angle mode.

Moreover, if a mode is switched to a wide-angle mode in response to a pinch-in gesture, one embodiment of the present invention proposes further outputting a handler 302 capable of controlling a zoom function and a mode switching.

If a sliding object 303 of the handler 302 is touched and dragged 10b to a wide-angle mode section, the controller 180 switches a capturing mode to a wide-angle mode. If the sliding object 303 is touched and dragged to a zoom area, the controller can control a camera zoom function in a normal mode.

As shown in FIG. 3C, if a touch input 10c is received on a wide-angle preview image 301-2, the controller 180 can take a picture via a wide angle camera.

Meanwhile, it is difficult for a normal user to determine a condition appropriate for using a wide angle camera unless the normal user learns a picture taking skill. Hence, an object of one embodiment of the present invention is to automatically determine a condition suitable for capturing a picture with a wide angle camera and provide appropriate picture taking environment according to the determined result.

In the following, various embodiments for a wide-angle capturing condition are explained. Yet, it is apparent that each of the embodiments is not independently applied and a plurality of embodiments are complexly applied.

Wide-angle Capturing Condition—Analyzing Preview Screen

One embodiment of the present invention proposes analyzing images received from at least one of a normal camera or a wide angle camera in a picture taking mode (a normal or a wide-angle mode) and determining a wide-angle capturing condition based on a result of the analysis. Regarding this, it shall be explained with reference to FIG. 4 to FIG. 6 in the following.

Figure 4A:
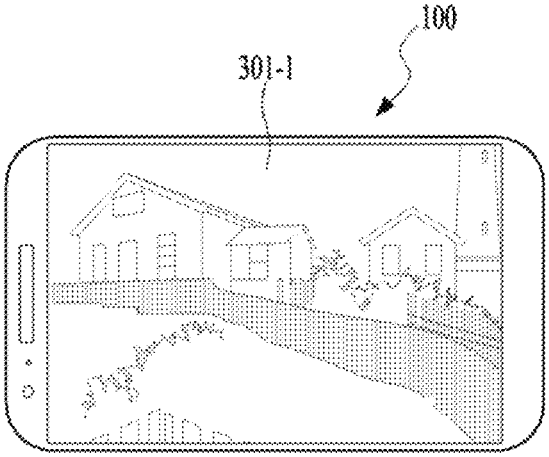
FIGS. 4A-4C are diagrams for a control method of determining whether a condition is suitable for capturing a picture with a wide angle in a manner of analyzing an image received via a camera according to one embodiment of the present invention.
Figure 4B:
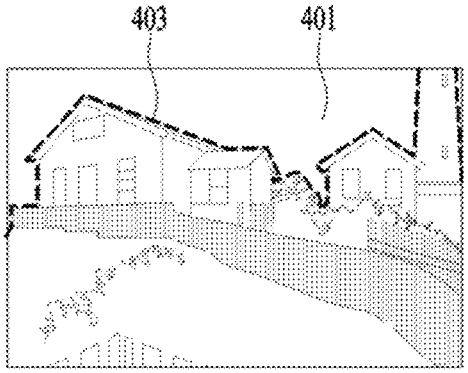
Figure 4C:
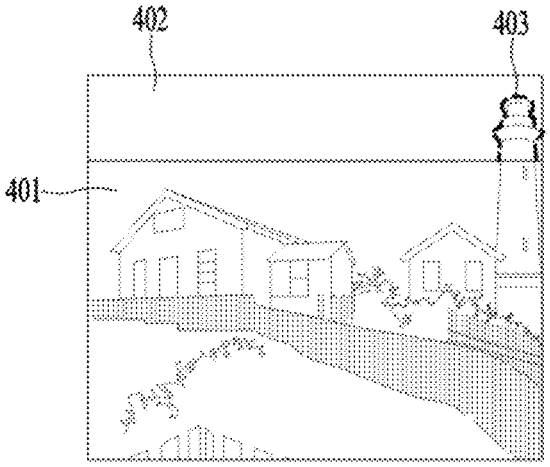

FIGS. 4A-4C are diagrams for a control method of determining whether a condition is suitable for capturing a picture with a wide angle in a manner of analyzing an image received via a camera according to one embodiment of the present invention.

Referring to FIG. 4A, the controller 180 outputs a normal preview screen 301-1 via a touch screen 151. And FIG. 4B shows a normal image 401 received through a normal camera.

The controller 180 according to one embodiment of the present invention determines whether a condition corresponds to a wide-angle capturing condition by analyzing the normal image 401 received through the normal camera. The controller 180 identifies a subject of the normal image 401 and an outer boundary of the subject. If the identified subject is not included entirely in the normal image 401 and a part of the subject is cut off, the controller 180 can determine it as a good condition for taking a picture with a wide angle camera. This is because it is preferable to take a picture in a manner of including the entire subject in the picture.

Hence, according to one embodiment of the present invention, the controller 180 analyzes an outer boundary 403 of a subject included in a normal image 401 and determines a condition in which a part of the subject is cut off as a wide-angle capturing condition. When the entire subject is not included in a normal image 401, if the subject is captured by a wide angle but the entire subject is still not included, it may not be satisfactory. Hence, according to another embodiment of the present invention, a wide-angle image 402 received through a wide angle camera is further analyzed. If the entire subject corresponding to the wide-angle image 402 is included, the controller 180 may determine it as a wide-angle capturing condition.

FIG. 4C is a conceptual diagram for an image with which a normal image 401 and a wide-angle image 402 are overlapped. As mentioned in the foregoing description, if a wide angle camera and a normal camera are arranged in a manner of being adjacent to each other, the wide-angle image 402 can include the normal image 401.

Referring to an example shown in FIG. 4C, when an outer boundary 403 of a subject is analyzed in the wide-angle image 402, it is able to determine that the entire subject is included in the wide-angle image. Hence, even if the entire subject is not included in the normal image 401, it is able to determine that the entire subject is included in the wide-angle image 402.

Unlike the example shown in the drawing, if the entire subject is still not included in the wide-angle image 402, it may not satisfy a wide-angle capturing condition.

Although it shall be explained in detail in the following description, if a wide-angle capturing condition is satisfied, a picture can be taken using both a normal camera and a wide angle camera in response to a capture command of a user. In particular, pictures (401 and 402 in the example of FIG. 4C) taken by each of the cameras can be stored together.

In the following, a wide-angle capturing condition is explained with reference to FIGS. 5A and 5B in case that a subject corresponds to people.

Figure 5A:
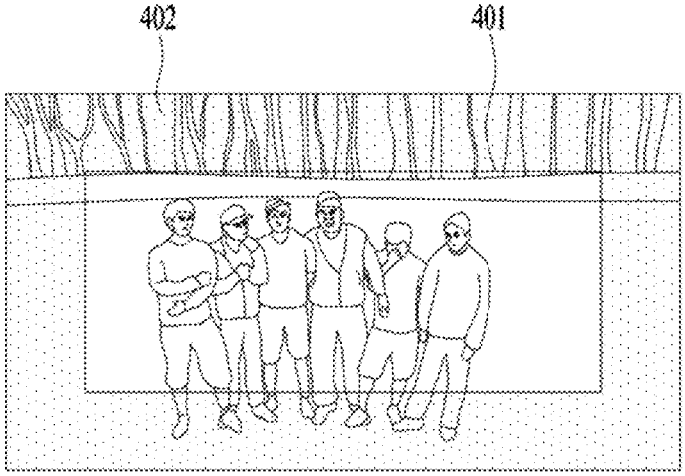
FIGS. 5A and 5B are diagrams for explaining a wide-angle capturing condition in case of capturing a picture of people.
Figure 5B:
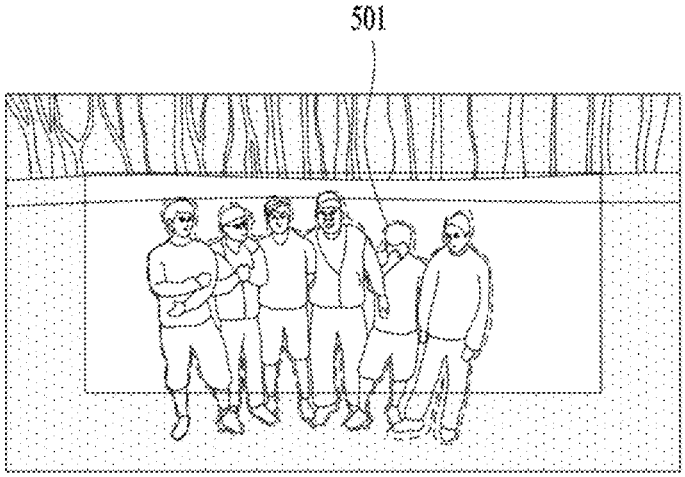

FIGS. 5A and 5B are diagrams for explaining a wide-angle capturing condition in case of capturing a picture of people. FIGS. 5A and 5B are conceptual diagrams for a picture with which a normal image 401 including a subject of people and a wide-angle image 402 are overlapped. Hence, although a preview screen actually displayed via a touch screen 151 may display the overlapped screen, it may display the normal image 401 or the wide-angle image 402.

The controller 180 can recognize that a subject corresponds to a person in a manner of recognizing a face of at least one or more persons included in the normal image 401 or the wide-angle image 402.

According to one embodiment of the present invention, when a person corresponds to a subject, a condition of a shaken focus on the subject becomes a wide-angle capturing condition. This is because, if a focus on a person is not fixed, it is necessary to take a picture of a background instead of a person. In particular, when a picture is taken in response to a capture command, if a focus on a subject is out of focus or the focus on the subject is not fixed, the controller 180 can take a picture using a normal camera and a wide angle camera. And, since a focal length of the normal camera and a focal length of the wide angle camera are different from each other, although a subject is not fixed in a normal mode, it may be able to secure an image of which the subject is fixed in a wide-angle mode.

As shown in FIGS. 5A and 5B, it may be able to determine whether environment is suitable for capturing a picture with a wide-angle in a manner of determining whether a person corresponding to a subject is included in a normal image 401 according to the embodiment mentioned earlier in FIG. 4A.

Referring to FIGS. 5A and 5B, a plurality of persons are shown in a normal image 401 and a wide-angle image 402 as a subject. The controller 180 can analyze an outer boundary of each person or an outer boundary 501 for a plurality of the persons.

When the outer boundary 501 is analyzed, if a person corresponding to a subject is not included in the normal image 401 and is cut off, the controller 180 may satisfy a wide-angle capturing condition. Moreover, it may be able to further analyze the wide-angle image 402 and may be then able to further include whether the person corresponding to the subject is also included in the wide-angle image 402 in the wide-angle capturing condition. In particular, if a person is not included in the normal image 401 and the entire people are included in the wide-angle image 402, it can be configured as the wide-angle capturing condition.

Meanwhile, as a wide-angle capturing condition, it may consider the number of persons included in a picture as a subject. This is because, in case of taking a group picture, it is preferable to take a picture widely in terms of a composition of a picture. For instance, if the number of persons included in a normal image 401 or a wide-angle image 402 is greater than a prescribed number, the controller 180 can determine that the wide-angle capturing condition is satisfied.

The embodiments mentioned earlier with reference to FIGS. 4A-4C and FIGS. 5A-5B described the wide-angle capturing condition in case that at least one or more subjects and a background of the subjects are included in a picture together. In the following, a wide-angle capturing condition is explained with reference to FIGS. 6A and 6B in case that a background is not included by subjects.

Figure 6A:
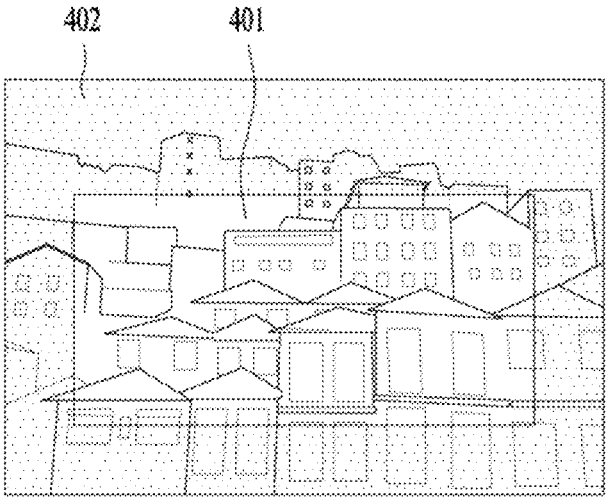
FIGS. 6A and 6B are diagrams for explaining a wide-angle capturing condition in case that there is no background according to one embodiment of the present invention.
Figure 6B:
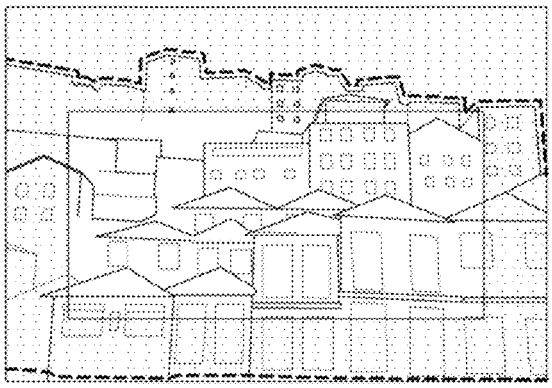

FIGS. 6A and 6B are diagrams for explaining a wide-angle capturing condition in case that there is no background according to one embodiment of the present invention. FIGS. 6 A and B are conceptual diagrams for a picture with which a normal image 401 and a wide-angle image 402 are overlapped. Hence, although a preview screen actually displayed via a touch screen 151 may display the overlapped screen, it may display the normal image 401 or the wide-angle image 402.

In FIG. 6A, referring to a normal image 401 (an image within a line border) corresponding to an image received through a normal camera, a plurality of buildings are included in the image as a subject. In particular, a plurality of buildings are displayed in a manner that the normal image 401 is packed with the plurality of buildings. In particular, there is no space in the normal image 401 except for the subjects, i.e., the plurality of buildings.

If a captured picture is filled with subjects only and there is no background, the picture may not have a good composition. Hence, as shown in FIG. 6B, according to one embodiment of the present invention, the controller 180 analyzes the normal image 401. As a result, if there is no space or little space in the normal image except for the subjects, the controller 180 can determine it as a case of satisfying a wide-angle capturing condition. In this case, the controller 180 can determine a ratio of a space in the image via an image analysis algorithm. If the ratio of the space is less than a prescribed value, the controller 180 can determine it as a wide-angle capturing condition.

Moreover, according to another embodiment of the present invention, it may be able to determine the wide-angle capturing condition in a manner of further considering diversity of colors as well as existence or nonexistence of the space or the ratio of the space.

If a plurality of subjects included in the image shown in FIGS. 6A and 6B have colors that are different from each other, it may be preferable to take a picture of a plurality of the subjects with a wider screen.

Hence, according to one embodiment of the present invention, if it is determined that an image included in a normal image 401 or a wide-angle image 402 has various colors via an image analysis algorithm, it can be configured as a wide-angle capturing condition.

Similarly, when a wide-angle capturing condition is satisfied, if a capture command is received from a user, the controller 180 can control both a normal camera and a wide angle camera to take a picture.

The embodiments mentioned earlier with reference to FIG. 4A to FIG. 6B described the control method of determining a wide-angle capturing condition using an image received through a normal camera or a wide angle camera or a preview screen of the image outputted on a touch screen. In the following, a control method of determining a wide-angle capturing condition based on a distance to a subject is explained with reference to FIG. 7 to FIG. 11B.

Wide-angle Capturing Condition Based on Distance (Depth) to Subject

A subject according to one embodiment of the present invention may correspond to an object included in an image received through a camera. It is apparent that the subject includes a person, an animal, or an object. In case of a picture of landscape, the subject may also include a building, a structure, or a background. Yet, although such a background as sky or the ground has no specific object, it may be included in the subject according to one embodiment of the present invention. In particular, a distance to the above-mentioned background is very far.

Figure 7:
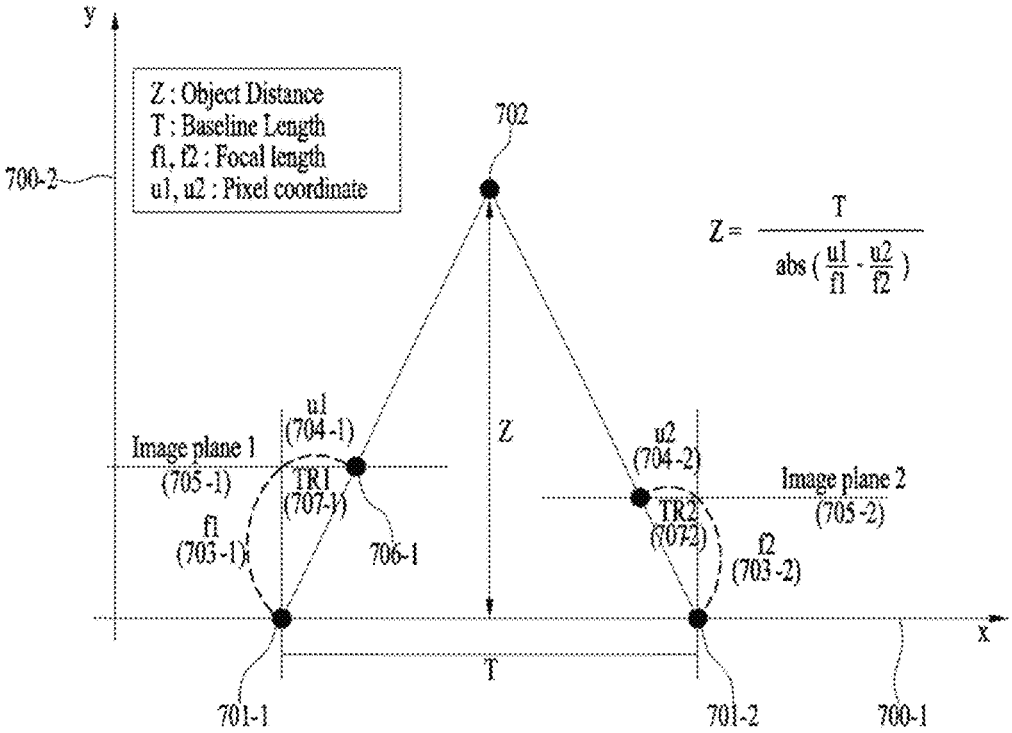
FIG. 7 describes a method of measuring a distance to a subject.

A method of measuring a distance to a subject is explained with reference to FIG. 7. FIG. 7 is a diagram for an example of measuring a distance to a subject in a pin-hole model according to one embodiment of the present invention.

A first projection center 701-1 and a second projection center 701-2 for two cameras are arranged on the X axis. The Y axis is facing a subject 702. Since a focal length of a normal camera and a focal length of a wide angle camera are different from each other, the normal camera and the wide angle camera have image planes that are different from each other.

A first image plane 705-1 is located at a point that is apart from the first projection center 701-1 of the wide angle camera as much as a focal length f1 703-1 and a second image plane 705-2 is located at a point that is apart from the second projection center 701-2 of the normal camera as much as a focal length f2 703-2. If the subject 702 and the first projection center 701-1 are connected with each other by a straight line, the first image plane and the straight line meet on u1 704-1 and may be able to form a first right triangle (TR1) 707-1. Similarly, if the subject 702 and the second projection center 701-2 are connected with each other by a straight line, it may be able to form a second right triangle (TR2) 707-2. In case of using a fact that the first and the second right angle triangles 707-1/707-2 are similar, a distance Z to the subject 702 can be calculated as shown in Equation 1 in the following.

$$Z = \frac{T}{\mathrm{abs}\left(\frac{u1}{f1} - \frac{u2}{f2}\right)} \quad \text{[Equation 1]}$$

The aforementioned method of measuring a distance to a subject using two cameras is merely an example according to an embodiment of the present invention. However, the present invention may be non-limited by the method.

One embodiment of the present invention proposes determining a wide-angle capturing condition using at least two or more distances to the subject 702. More specifically, at least two or more distances mean to consider not only a distance to a subject but also a distance to a subject near a main subject.

For instance, if there is a person as a main subject 702 and landscape is seen in the vicinity of the person, it may consider not only a distance to the person corresponding to the main subject 702 but also consider a distance to the surrounding landscape (it may consider the landscape as a subject). In this case, in case of measuring the distance to the landscape, which is considered as the subject, it may be able to measure a very long distance.

Figure 8:
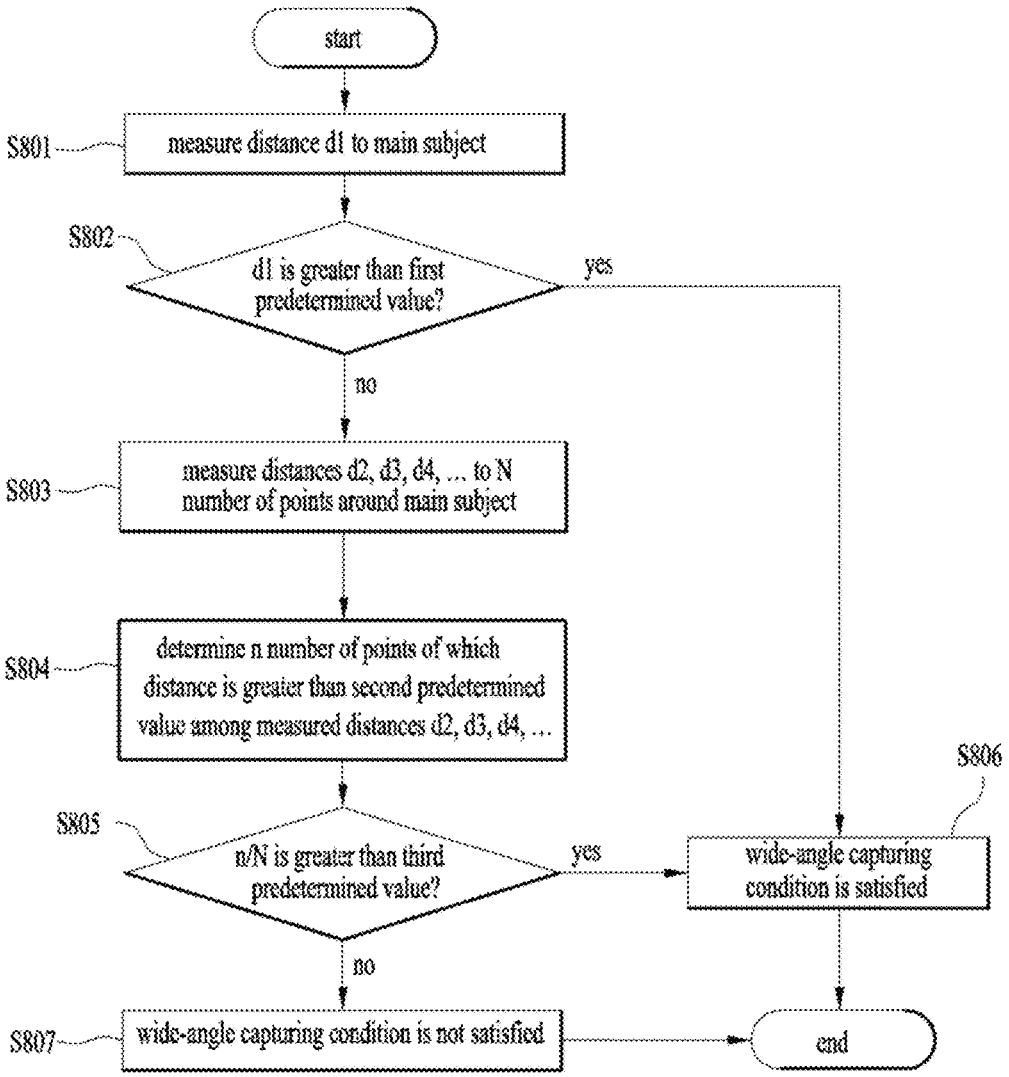
FIG. 8 is a flowchart for a method of determining a wide-angle capturing condition using at least two or more distances to a subject according to one embodiment of the present invention.

In the following, it is explained in more detail with reference to a flowchart of FIG. 8. FIG. 8 is a flowchart for a method of determining a wide-angle capturing condition using at least two or more distances to a subject according to one embodiment of the present invention.

In step S801, the controller 180 measures a distance d1 to a main subject from a mobile terminal. In this case, the main subject may indicate a subject to be captured by a user. Such an object recognized at the center of an image as a person, an object or an animal may become the main subject. Or, such an object located at a point at which a focus of a lens is formed as a person, an object or an animal may become the main subject.

In case of a simple picture of landscape, an object recognized as a main subject may not exist. In this case, in step S801, the controller 180 may be able to measure a distance d1 to a central region of an image instead of a distance to a main subject.

If the measured distance d1 is greater than a first predetermined value (first predetermined distance), it may proceed to step S806. In case of proceeding to S806, it is determined that a wide-angle capturing condition is satisfied. This is because a distance to the main subject is far. A detailed example for the aforementioned case is explained with reference to FIGS. 9A and 9B in the following.

Figure 9A:
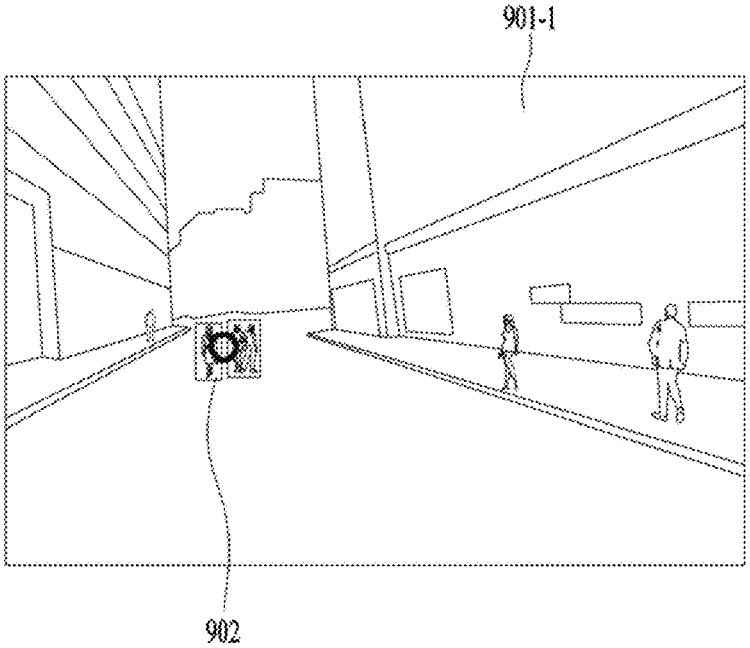
FIGS. 9A and 9B are diagrams of an exemplary image for explaining a wide-angle capturing condition according to one embodiment of the present invention in case that a distance d1 to a main subject is far.
Figure 9B:
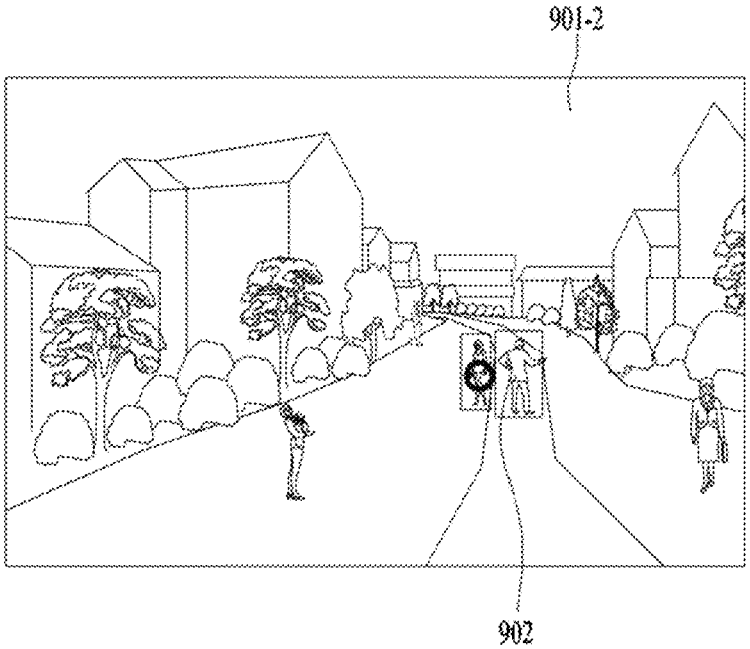

FIGS. 9A and 9B are diagrams of an exemplary image for explaining a wide-angle capturing condition according to one embodiment of the present invention in case a distance d1 to a main subject is far.

Referring to a first exemplary image 901-1 of FIG. 9A, a person corresponding to a main subject 902 is positioned at the center of the image and buildings are lined up at the left and the right sides of the person. Since a distance to the main subject 902 is pretty far (d1>first predetermined value), the first exemplary image 901-1 is suitable for capturing by a wide angle.

Subsequently, referring to a second exemplary image 901-2 of FIG. 9B, it is able to see a person corresponding to a main subject 902 at the center of the image. Since a distance to the main subject 902 is pretty far (d1>first predetermined value) in the second exemplary image 901-2 as well, the second exemplary image 901-2 is also suitable for capturing by a wide angle.

In particular, according to one embodiment of the present invention, if a distance to a main subject 902 is far, a distance to other subject except for the main subject 902 is not considered. This is because an intention of a user capturing a picture is to capture a background or landscape at which the main subject 902 is located rather than clearly capture the main subject 902 in the picture.

On the contrary, if a distance to the main subject 902 is close enough (d1<first predetermined value), it is necessary to consider a distance to the surrounding of the main subject 902 as well. Regarding this, it shall be explained with reference to the remaining flowchart of FIG. 8 and a different example of FIGS. 10A and 10B in the following.

Figure 10A:
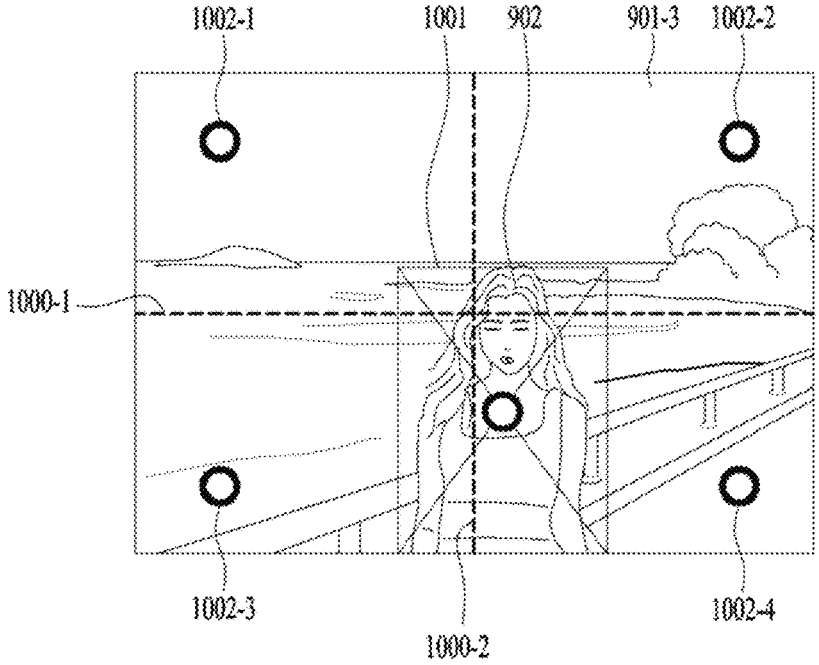
FIGS. 10A and 10B are diagrams of an exemplary image for explaining a wide-angle capturing condition according to one embodiment of the present invention in case that a distance d1 to a main subject is close.
Figure 10B:
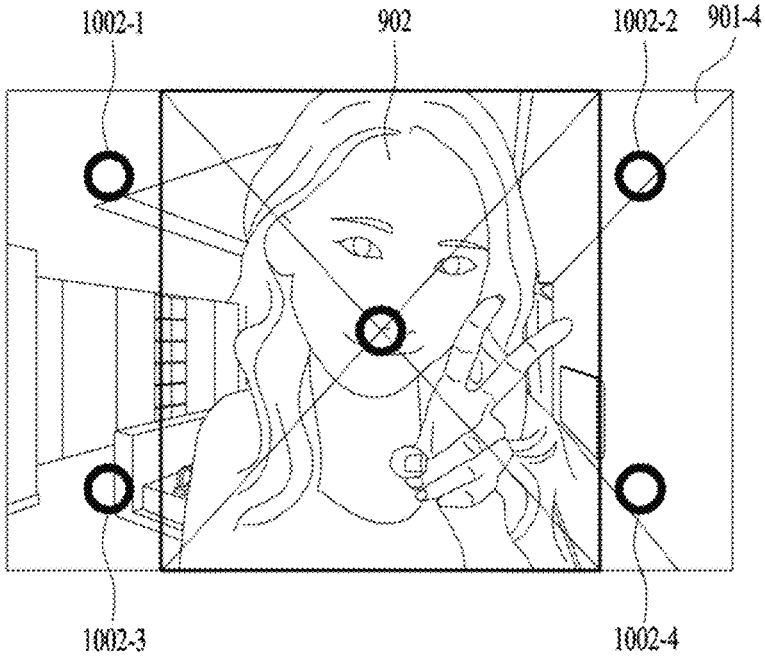

FIGS. 10A and 10B are diagrams of an exemplary image for explaining a wide-angle capturing condition according to one embodiment of the present invention in case that a distance d1 to a main subject is close.

In step S802, if a measured distance d1 is equal to or less than a predetermined value, the controller 180 may proceed to step S803. In step S803, the controller 180 can measure distances to the N number of points (d2, d3, d4, . . . ) around a main subject 902. In this case, N can be configured in various ways in a manner of starting from 1. Although an example of FIGS. 10A and 10B explain N in a manner of being restricted to 4, by which the present invention may be non-limited. The N number of points may correspond to points corresponding to predetermined positions on an image.

According to one embodiment of the present invention, a predetermined position corresponds to a position existing at each area of which an image received from a camera is divided by 4. In this case, as shown in FIG. 10A, the image divided by 4 corresponds to 2×2 divided areas on the basis of a horizontal line 1000-1 and a vertical line 1000-2. The horizontal line 1000-1 and the vertical line 1000-2 are simply conceptual lines and the lines are not actually displayed on the image.

In step S803, referring to FIG. 10A, in order to identify surroundings of the main subject 902, it may be able to firstly identify an area 1001 occupied by the main subject 902 on an image and points 1002-1 to 1002-4 except for the identified area may become the surroundings of the main subject 902. In this case, a first surrounding point to a fourth surrounding point 1002-1 to 1002-4 are respectively positioned as points corresponding to predetermined positions of a first area to a fourth area of the area divided by 4.

If a background of the main subject 902 is far, it is determined that the background corresponds to landscape and one embodiment of the present invention proposes taking a picture with a wide angle. On the other hand, if the surrounding of the main subject 902 is not that far away (e.g., in case of taking a selfie indoors etc.), it is not necessary to take a picture with a wide angle. In order to judge the aforementioned two cases, one embodiment of the present invention proposes measuring a distance to a point of the surrounding of the main subject 902.

Referring to a third exemplary image 901-3 of FIG. 10A, if distances to a first surrounding point to a fourth surrounding point 1002-1 to 1002-4 correspond to d2, d3, d4 and d5, respectively, the distance d2 to the first surrounding point 1002-1 and the distance d3 to the second surrounding point 1002-2 may have a very big value, since there is no subject, or sky or cloud is considered as a subject.

Since the distance d4 to the third surrounding point 1002-3 indicates a distance to the ground, although d4 is not greater than d2 or d3, d4 may have a pretty big value. Lastly, since the fourth surrounding point 1002-4 corresponds to a point of a guardrail near a person corresponding to the main subject 902, the distance d5 to the fourth surrounding point may have a value that is similar to the distance to the main subject 902.

One embodiment of the present invention proposes determining the number of surrounding points that are far from a mobile terminal and determining a wide-angle capturing condition based on the number. As shown in FIG. 10A, distances to the first to third surrounding point 1002-1 to 1002-3 are far away and the distance to the fourth surrounding point 1002-4 is close. Hence, in this case, wide-angle capturing may be appropriate for taking a picture of surrounding landscape. Among the total 4 surrounding points 1002-1 to 1002-4, the number of surrounding points that are far from the mobile terminal corresponds to 3. Hence, generally speaking, it can be considered that distances to the surrounding points are far away from the mobile terminal. Hence, this case may correspond to a wide-angle capturing condition. In particular, it may consider a ratio of surrounding points that are far away from the mobile terminal among the total number of the surrounding points.

Hence, among the distances measured in step S803, it may be able to determine the number n of far surrounding points (surrounding points of which distance is greater than a second predetermined value) and calculate a ratio n/N corresponding to the ratio of the far surrounding points to the total surrounding points. The bigger the n/N, the farther the distance to the surrounding points. The smaller the n/N, the closer the distance to the surrounding points. Hence, in step S805, if the n/N is greater than a third predetermined value, it may proceed to step S806 and determine it as being matched with a wide-angle capturing condition. If the n/N is equal to or less than the third predetermined value, it may proceed to step S807 and determine it as not being matched with the wide-angle capturing condition.

Regarding this, it is explained with reference to a fourth exemplary image 901-4 of FIG. 10 B in the following. Referring to the fourth exemplary image 901-4, a person occupies a considerable amount of area as a main subject 902 and the subject is taken indoors.

In the fourth exemplary image 901-4, distances to a first surrounding point to a fourth surrounding point 1002-1 to 1002-4 may have values which are not that big (less than a second predetermined value). Hence, since n corresponds to 0 among the total N number of the surrounding points, n/N may correspond to 0. Since a value of n/N is smaller than the third predetermined value, the controller 180 can determine it as not being matched with the wide-angle capturing condition (S807).

If a distance to a surrounding point is close enough, it can be considered that a picture is taken indoors. Hence, normal capturing is more appropriate than a wide-angle capturing in this case.

Meanwhile, although the aforementioned embodiment has considered the ratio of n/N, since N is a predetermined value anyway, it is apparent that the wide-angle capturing condition is determined based on whether a value of n is greater than a predetermined value (fourth predetermined value).

Meanwhile, although the aforementioned embodiment has explained about measuring distances to 4 surrounding points only, if the number of the surrounding points to be measured increases, it may be able to make a more precise determination. Regarding this embodiment, it shall be explained with reference to FIGS. 11A and 11B in the following.

Figure 11A:
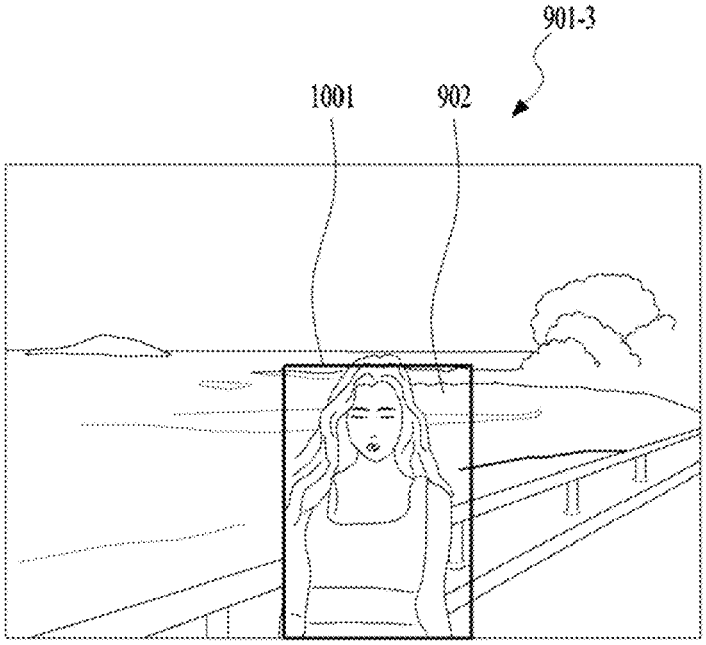
FIGS. 11A and 11B are diagrams for an embodiment of increasing the number of surrounding points according to one embodiment of the present invention.
Figure 11B:
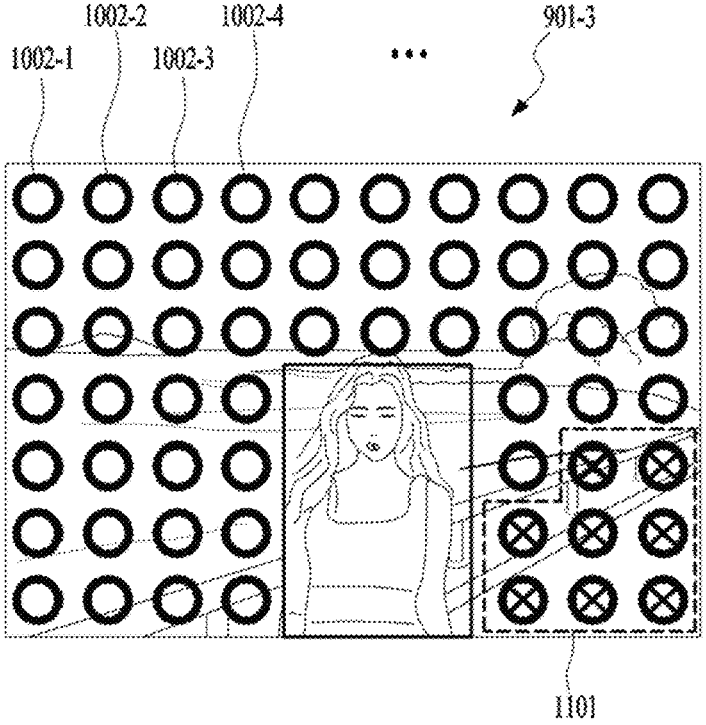

FIGS. 11A and 11B are diagrams for an embodiment of increasing the number of surrounding points according to one embodiment of the present invention.

Referring to FIG. 11A, it shows the third exemplary image 901-3 used in FIG. 10 A and an area 1001 occupied by a main subject 902 in an image.

FIG. 11B shows an example for positions of 58 (=N) surrounding points 1002-1, 1002-2, . . . except for the area 1001. As shown in the example, the positions of the surrounding points can be arranged in a form of a grid or can be arranged at a random position except for the area 1001.

Among the 58 surrounding points 1002-1, 1002-2, . . . , surrounding points of which a measured distance is close correspond to 8 surrounding points included in an area 1101. Hence, the number of surrounding points of long distance corresponds to 50 (=n).

In case of calculating the ratio (n/N) of the number (n=50) of the surrounding points of a long distance to the total number (N=58) of the surrounding points, it may be able to get such a result as 25/29. According to the result, it may be able to determine it as a distance to a surrounding point is far away in general (in step S805, proceed to step S806 according to 'yes' path). In particular, if the number of surrounding points for measuring a distance increases, although a processing speed becomes slower due to the measurement of more distances, it may be able to more precisely determine a wide-angle capturing condition.

In the following, a control method of determining a movement of a photographer (user) as a wide-angle capturing condition is explained.

Wide-angle Capturing Condition Based on Movement of User

FIGS. 12A and 12B, FIGS. 13A and 13B are diagrams for a control method of determining a wide-angle capturing condition based on a capturing action of a user according to one embodiment of the present invention.

Figure 12A:
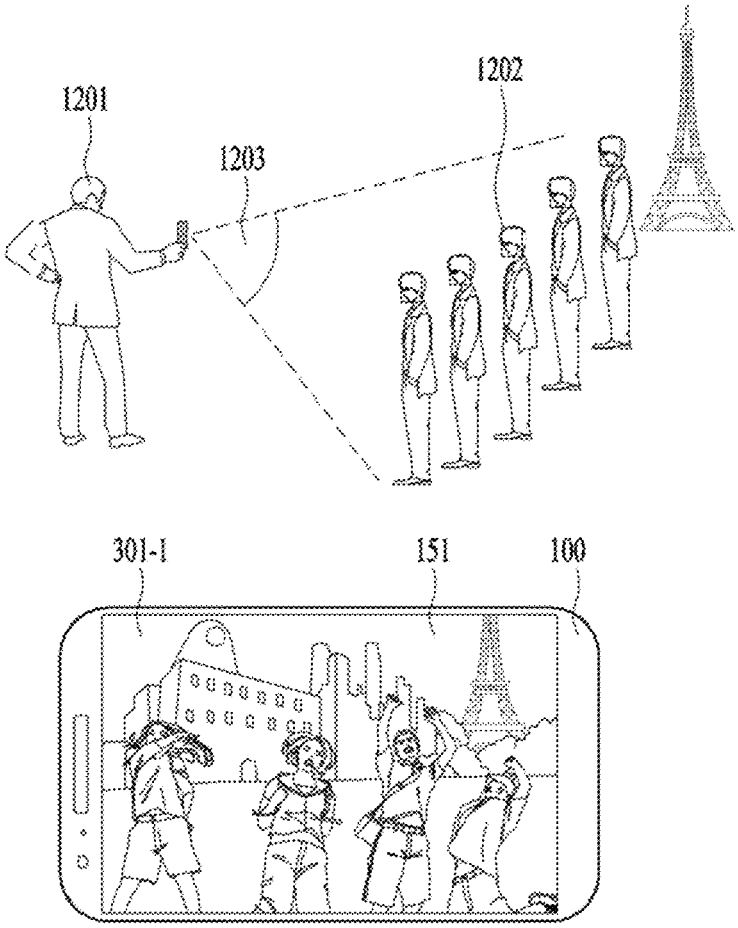
FIGS. 12A and 12B are diagrams for a control method of determining a wide-angle capturing condition based on a capturing action of a user according to one embodiment of the present invention.

Referring to FIG. 12A, a user 1201 is capturing a subject 1202 using a normal camera. Hence, a normal preview image 301-1 of the normal camera is outputted via a touch screen 151. Since the normal camera has a narrow capturing angle 1203, a part of the subject may not be included in a screen.

If a movement of a user (photographer) moving backward is detected while the user is capturing a picture using a normal camera, it can be considered as an intention of capturing a picture widely. Hence, if the movement is detected, the controller 180 can determine that a wide-angle capturing condition is satisfied. Hence, the controller 180 can automatically switch a camera into a wide angle camera. If the automatic switching is not intended by the user, the user may return to a previous state using a "cancel" button.

Figure 12B:
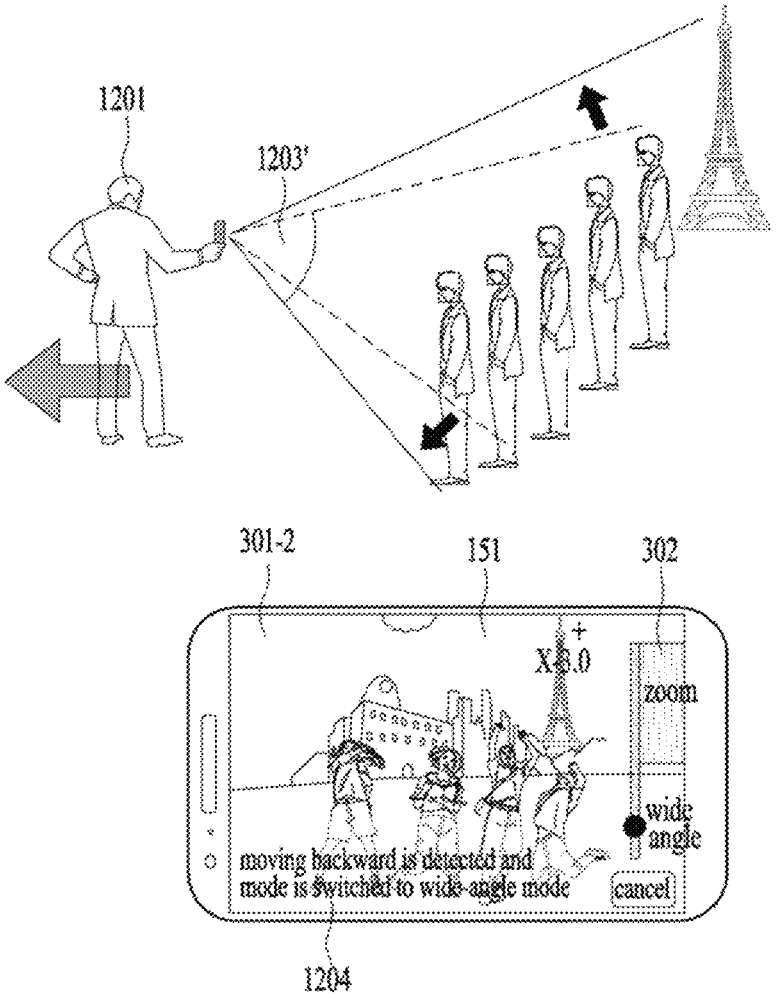

FIG. 12B is a diagram for a wide-angle preview screen 301-2 after a camera is switched to a wide angle camera. Since a capturing angle is widened from the capturing angle 1203 of the normal camera to a capturing angle 1203' of the wide angle camera, a part of the subject not included in the screen can be included in the screen in the widened capturing angle.

It may be able to further display a phrase 1204 guiding that a mode is switched to a wide-angle mode and optionally the aforementioned wide-angle mode indicator 300 and/or a handler 302, as previously shown in FIG. 3B, while the wide-angle preview screen 301-2 is displayed.

Figure 13A:
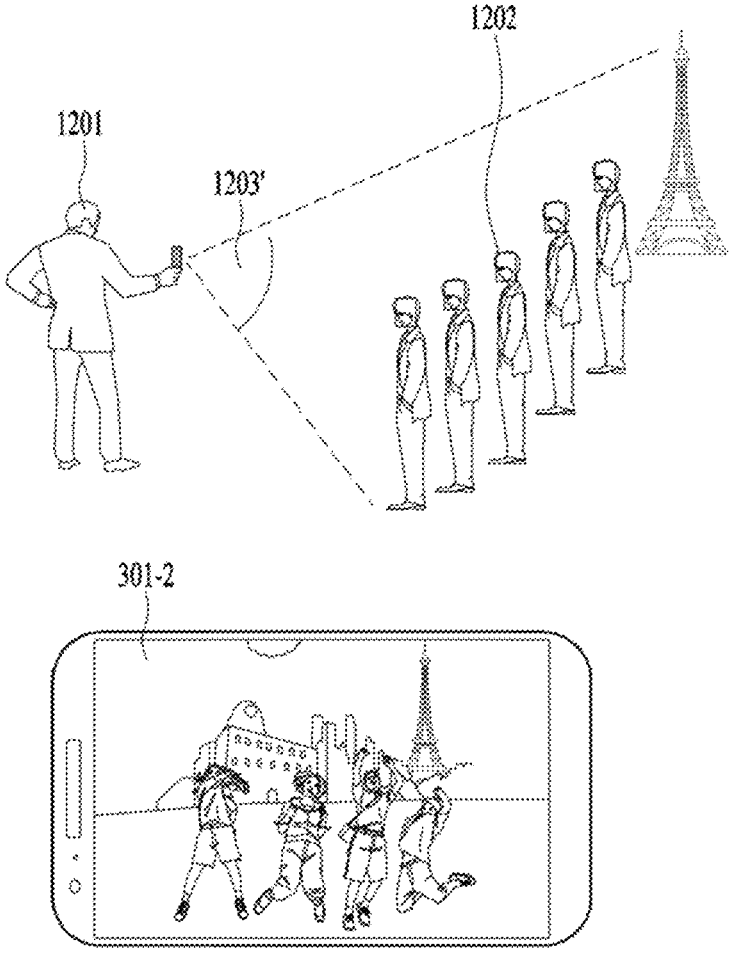
FIGS. 13A and 13B are diagrams for a control method of determining a wide-angle capturing condition based on a capturing action of a user according to one embodiment of the present invention.

On the contrary, referring to FIG. 13A, a user 1201 is capturing a subject 1202 using a wide angle camera. Hence, a wide-angle preview image 301-2 of the wide angle camera is outputted via a touch screen 151. Since the wide angle camera has a wide capturing angle 1203', a subject may be captured in a manner of being relatively small.

If a movement of a user (photographer) moving forward is detected while the user is capturing a picture using a wide angle camera, it can be considered as an intention of capturing a picture with a narrow angle. Hence, if the movement is detected, the controller 180 can determine that a wide-angle capturing condition is not satisfied. Hence, the controller 180 can automatically switch a camera into a normal camera. If the automatic switching is not intended by the user, the user may return to a previous state using a "cancel" button.

Figure 13B:
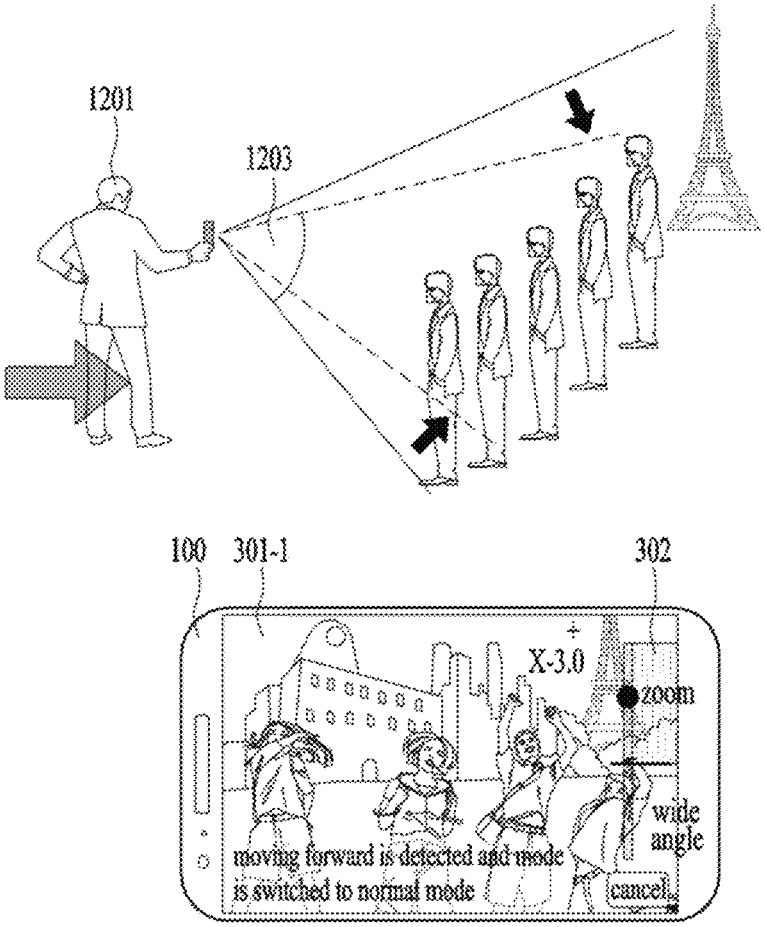

FIG. 13B is a diagram for a normal preview screen 301-1 after a camera is switched to a normal camera. Since a capturing angle is narrowed down from the capturing angle 1203' of the wide angle camera to a capturing angle 1203 of the normal camera, it may be able to capture a subject a little larger.

It may be able to further display a phrase guiding that a mode is switched to a normal mode and a handler 302, and optionally the aforementioned wide-angle mode indicator 300, as previously shown in FIG. 3B, while the normal preview screen 301-2 is displayed.

Meanwhile, if a specific voice is recognized, one embodiment of the present invention proposes taking a picture with a wide angle. Regarding this embodiment, it shall be explained with reference to FIGS. 14A and 14B in the following.

Wide Angle Capturing Condition—Specific Voice Recognition

Figure 14A:
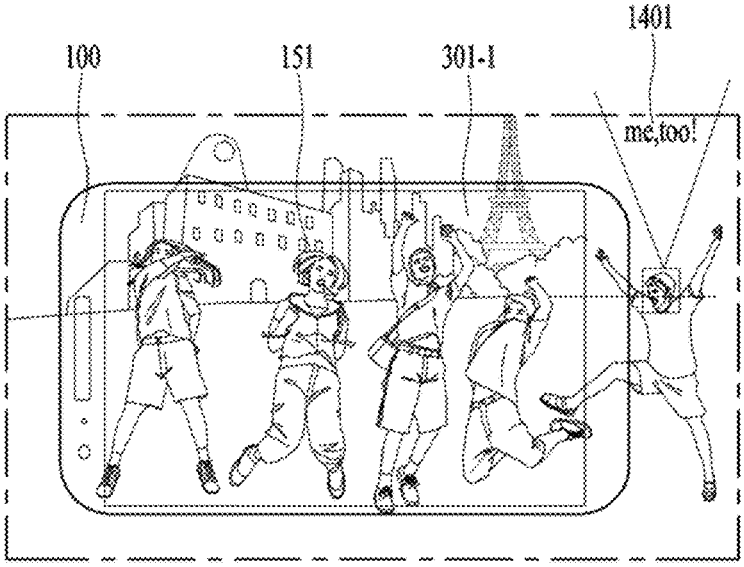
FIGS. 14A and 14B are diagrams for a control method of configuring recognition of specific voice as a wide-angle capturing condition according to one embodiment of the present invention.
Figure 14B:
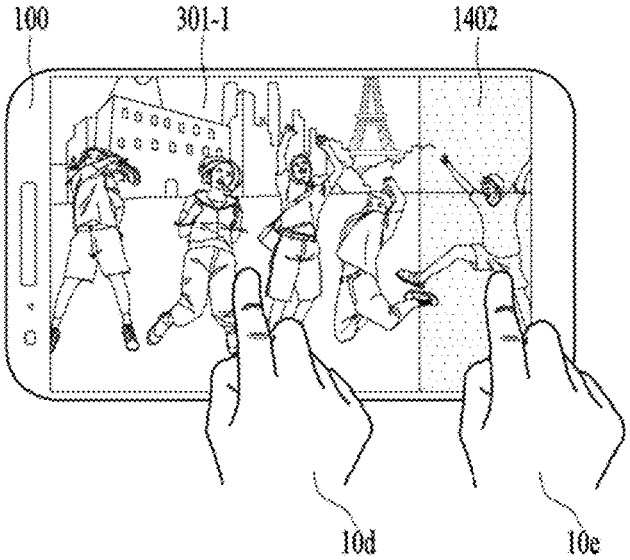

FIGS. 14A and 14B are diagrams for a control method of configuring recognition of a specific voice as a wide-angle capturing condition according to one embodiment of the present invention.

Referring to FIG. 14A, a normal preview screen 301-1 of a normal camera is outputted and a person is expressing an intention of taking picture of the person with a group of people who are about to take a picture of them. If the expression of the intention is recognized, it may be necessary to take a picture with a wide angle to include the person in the picture.

The expression of the intention may include, for example, "me", "here", "here it is", "this way", "kimchi" and the like.

In particular, if a predetermined voice is recognized, the controller 180 determines that a wide-angle capturing condition is satisfied. Moreover, it may be able to further determine whether a face of a corresponding person is facing a camera in an image received through an activated wide angle camera. If the face is facing the camera, the controller 180 can determine that the wide-angle capturing condition is satisfied. This is intended to prevent misrecognition. On the contrary, although the predetermined voice is recognized, if the face is not facing the camera, since it is not necessary to take a picture of the person together, the controller 180 can determine that the wide-angle capturing condition is not satisfied.

According to one embodiment of the present invention, if a wide-angle capturing condition is satisfied by recognizing a predetermined voice, it may be able to activate a wide angle camera and distinctively display an area 1402 occupied by a corresponding person in a normal preview image 301-1. This is intended to check a user on whether to include the corresponding person when the user takes a picture.

If an input 10d for touching a normal preview screen 301-1 except for the area 1402 is received, the controller 180 can return (return to FIG. 14A) to the original normal preview screen 301-1.

Referring to FIG. 14B, if an input 10e for touching the area 1402 is received, the controller 180 can take a picture in a manner of switching a camera into a wide angle camera.

So far, a control method of determining a wide-angle capturing condition has been explained in consideration of capturing environment or a user intention. In the following, a control method is explained in detail in case a wide-angle capturing condition is satisfied or dissatisfied.

Figure 15:
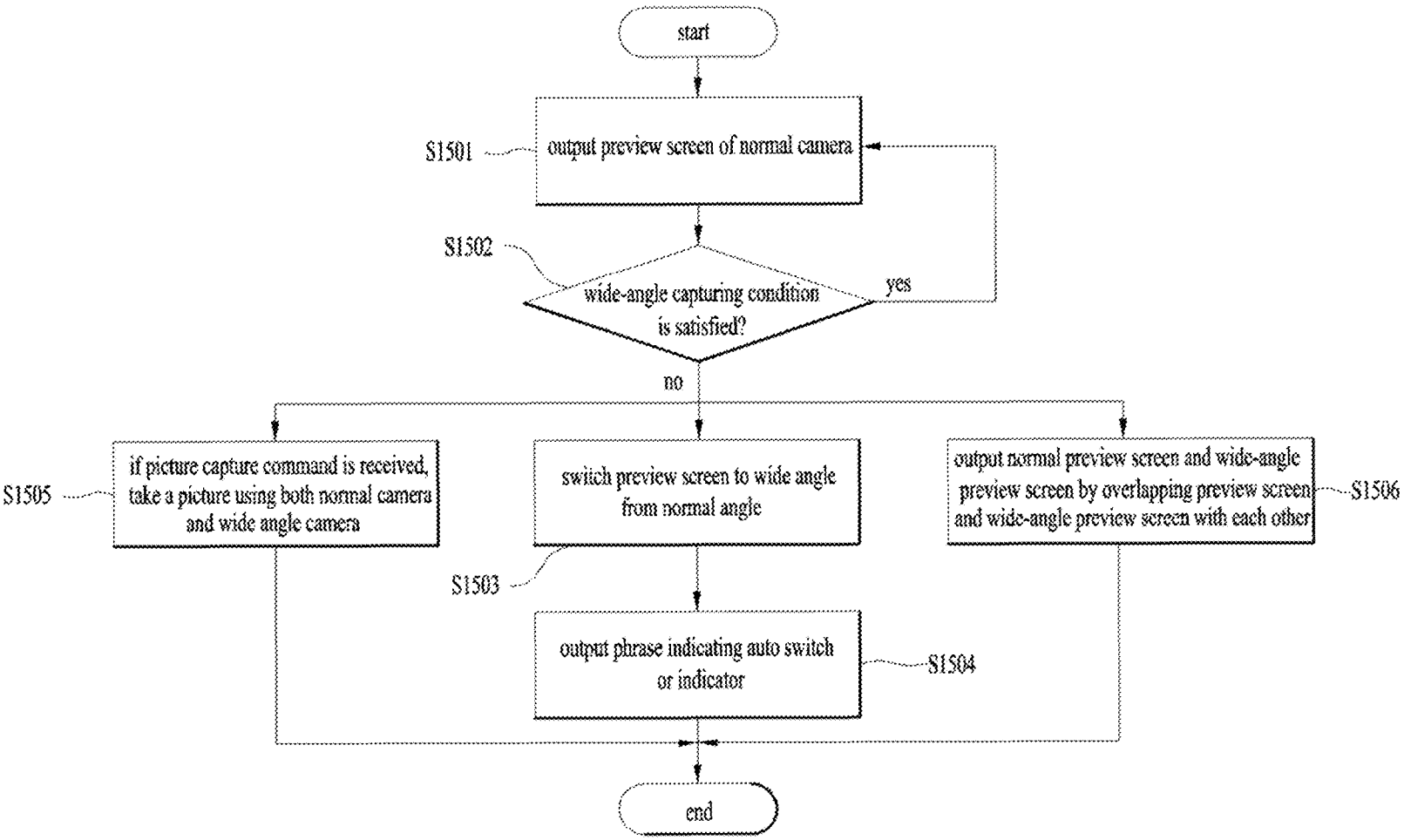
FIG. 15 is a flowchart for an example of available actions when a wide-angle capturing condition is satisfied according to one embodiment of the present invention.

FIG. 15 is a flowchart for an example of available actions when a wide-angle capturing condition is satisfied according to one embodiment of the present invention.

In step S1501, the controller 180 outputs a preview screen of a normal camera. In step S1502, the controller 180 determines whether a wide-angle capturing condition is satisfied. Since step S1501 and step S1502 are identical to what is mentioned earlier in the embodiment of the wide-angle capturing condition, a detailed explanation on the steps is omitted at this time.

If the wide-angle capturing condition is not satisfied in step S1502, it may be able to repeat step S1501. If the wide-angle capturing condition is satisfied, it may proceed to step S1505 and/or step S1506. Although it is able to proceed to either step S1505 or step S1506 from step S1502, it is also able to proceed to a plurality of steps at the same time. Each of step S1505 and step S1506 is explained with reference to drawings in the following.

If a Wide-Angle Capturing Condition is Satisfied—Take a Picture Using Both Normal and Wide Angle Cameras When a wide-angle capturing condition is satisfied, if a picture capture command is received, one embodiment of the present invention proposes taking a picture using both a normal camera and a wide angle camera. In particular, it may be able to store a normal image and a wide angle image from the normal camera and the wide angle camera, respectively. The stored images can be checked together when a user reads the captured images. In the following, a control method of reading a normal image and a wide angle image together is explained with reference to FIGS. 16A to 16D.

FIGS. 16A to 16D are diagrams for a control method of reading captured pictures together according to one embodiment of the present invention in case the pictures are captured using both a normal camera and a wide angle camera.

Figure 16A:
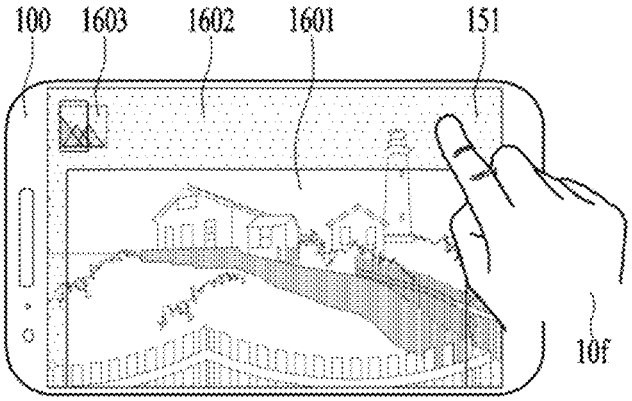
FIGS. 16A-16D are diagrams for a control method of reading captured pictures together according to one embodiment of the present invention in case that the pictures are captured using both a normal camera and a wide angle camera.

Referring to FIG. 16A, in an execution screen of a gallery application and the like for checking captured pictures, it is able to simultaneously output a normal image 1601 and a wide angle image 1602, which are captured by the aforementioned method. In this case, the wide angle image 1602 and the normal image 1601 can be outputted in a manner of being overlapped with each other. In particular, the controller 180 may output a wide-angle indicator 1603 indicating that the normal image 1601 and the wide angle image 1602 are captured at the same time on the execution screen for checking the captured pictures.

Figure 16B:
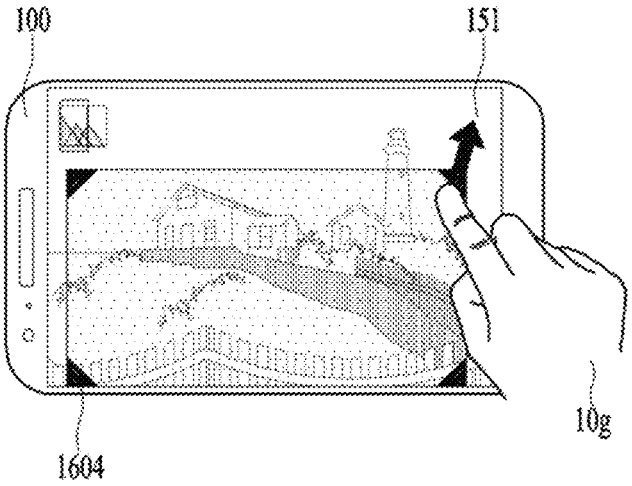

If a user determines that the normal image 1601 does not include all subjects preferred by the user, the user may intend to utilize a part of the wide angle image 1602. Hence, according to one embodiment of the present invention, if an input 10f for selecting the outputted wide angle image 1602 is received, it may be able to output an image area control indicator 1604 to expand to the wide angle image 1602. In this case, image area control handlers 1604 are located at 4 corners of the normal image 1601. If one of the image area control handlers is touched and dragged by an input 10g, an area corresponding to the corner can be adjusted (FIG. 16B to FIG. 16C).

Figure 16C:
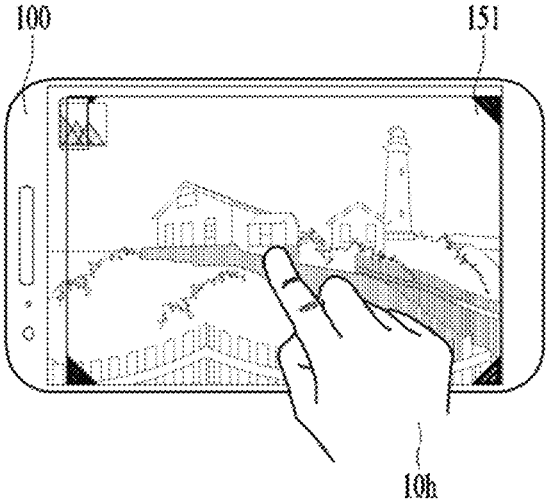
Figure 16D:
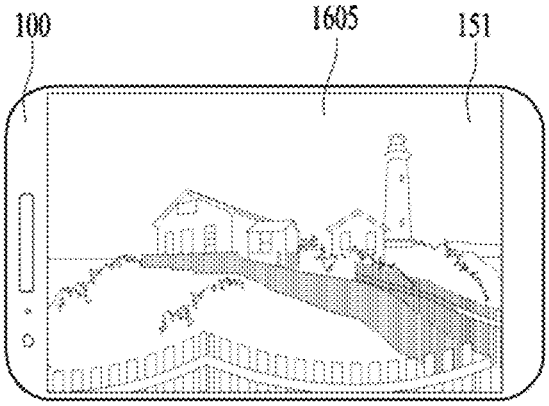

Referring to FIG. 16C, if an area is adjusted and then a confirm command 10h is received, the controller 180 can store an image of which the area is adjusted by a user among areas not included in the normal image 1601. In this case, as shown in FIG. 16D, the controller 180 can store the normal image 1601 and the wide angle image 1602 in a manner of composing the normal image 1601 and the wide angle image 1602 or store a designated area only among the wide angle image 1602. The controller 180 can store a final image 1605 corresponding to an area designated by the user no matter which scheme is used.

In this case, the normal image 1601 and the wide angle image 1602, which are respectively stored, are deleted and the final image 1605 can be stored instead. This is because, if the normal image 1601 and the wide angle image 1602 are stored together, it requires too much storing space for a single capture. On the contrary, it may be able to additionally store the final image 1605 without deleting the normal image 1601 and the wide angle image 1602. In this case, it may be able to repeatedly perform the area adjustment mentioned earlier in FIG. 16B in the future using the normal image 1601 and the wide angle image 1602 stored together.

Or, instead of separately storing the final image 1605, it may be able to store information on a designated area only. If a user reads the information, it may be able to control the designated area to be displayed only on the normal image 1601 or the wide angle image 1602.

In the following, step S1503 and step S1504 are explained with reference to FIGS. 12A and 12B again. In step S1503, the controller 180 can switch a preview screen (normal preview screen 301-1) outputted for a normal camera into a preview screen (wide-angle preview screen 301-2) outputted for a wide angle camera. As mentioned earlier referring to FIG. 12A, if a user capturing a picture moves backward (if a wide-angle capturing condition is satisfied), the controller 180 can switch the normal preview screen 301-1 (FIG. 12 A) into the wide-angle preview screen 301-2 (FIG. 12 B). In step S1504, the controller 180 can automatically output a phrase 1204 guiding that a mode is switched to a wide-angle mode (refer to FIG. 12 B).

Meanwhile, if a wide-angle capturing condition is satisfied, the embodiment mentioned earlier in FIGS. 12A and 12B have proposed automatically switching to the wide-angle mode. In the following, an embodiment associated with FIGS. 17A and 17B propose informing a user that a wide-angle capturing condition is satisfied and switching a mode based on a command of the user.

Figure 17A:
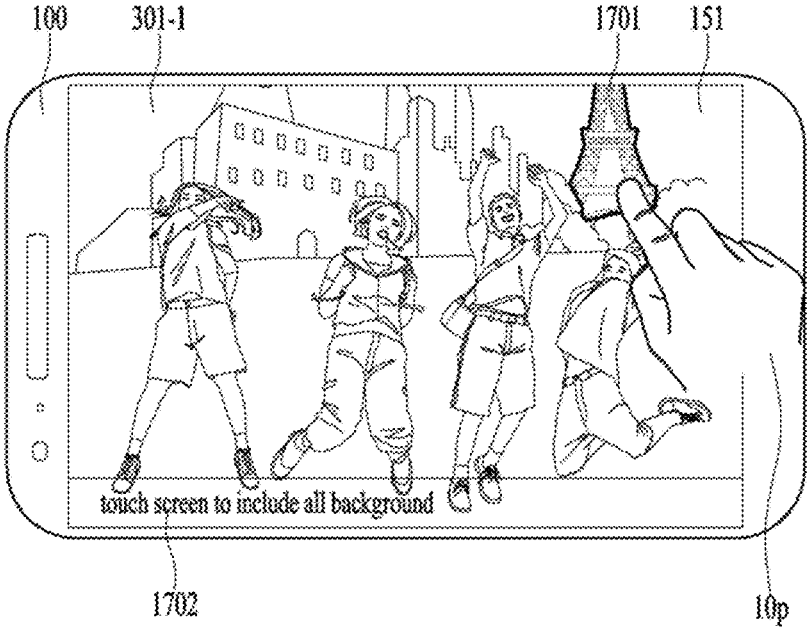
FIGS. 17A and 17B are diagrams for a control method of checking a user on whether to switch to a wide-angle capturing according to one embodiment of the present invention in case that a wide-angle capturing condition is satisfied.
Figure 17B:
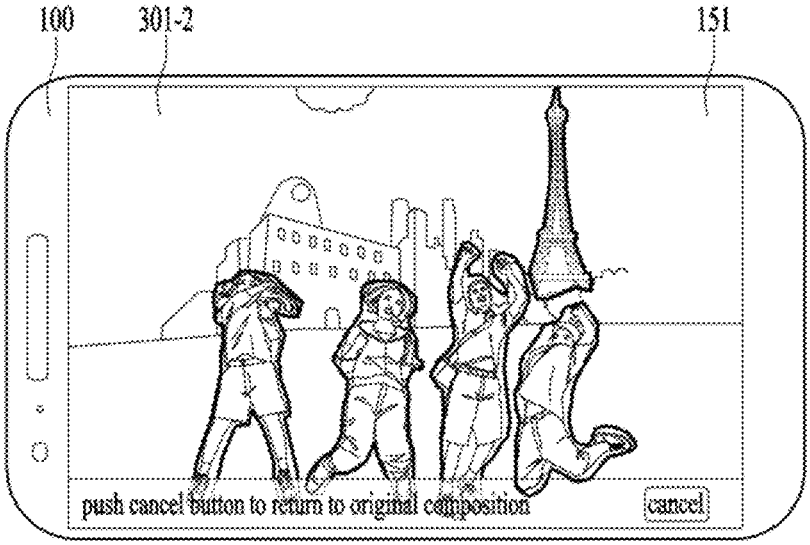

FIGS. 17A and 17B are diagrams for a control method of checking a user on whether to switch to a wide-angle capturing according to one embodiment of the present invention in case a wide-angle capturing condition is satisfied.

Referring to FIG. 17A, the controller 180 outputs a normal preview screen 301-1. If a wide-angle capturing condition is satisfied while the normal preview screen 301-1 is outputted, the controller 180 can output a phrase 1702 informing a user that the wide-angle capturing condition is satisfied. Moreover, the controller 180 can output a button (or an indicator) capable of switching an angle into a wide angle.

In particular, as mentioned earlier with reference to FIGS. 4A-4C, if there exists a subject not included in the normal preview screen 301-1, the controller 180 can output an indicator 1701 to distinctively display the subject. Referring to FIG. 17B, if an input 10p for touching the indicator 1701 is received, the controller 180 can switch the normal preview screen 301-1 into a wide-angle preview screen 301-2 to include the subject. When the normal preview screen 301-1 is switched into the wide-angle preview screen 301-2, if a picture capture command is received, a user can take a picture using a wide angle camera.

In the following, step S1501 is explained with reference to FIG. 18A- FIG. 19B.

Figure 18A:
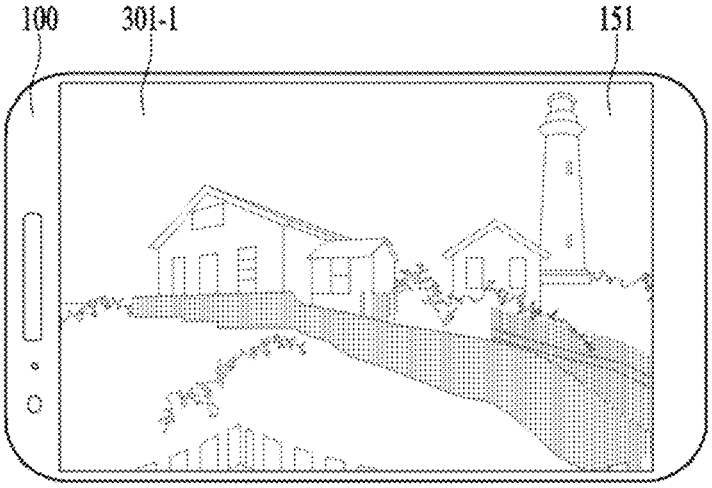
FIGS. 18A and 18B are diagrams for a control method of outputting a normal preview screen and a wide-angle preview screen in a manner of overlapping the normal preview screen and the wide-angle preview screen with each other according to one embodiment of the present invention.
Figure 18B:
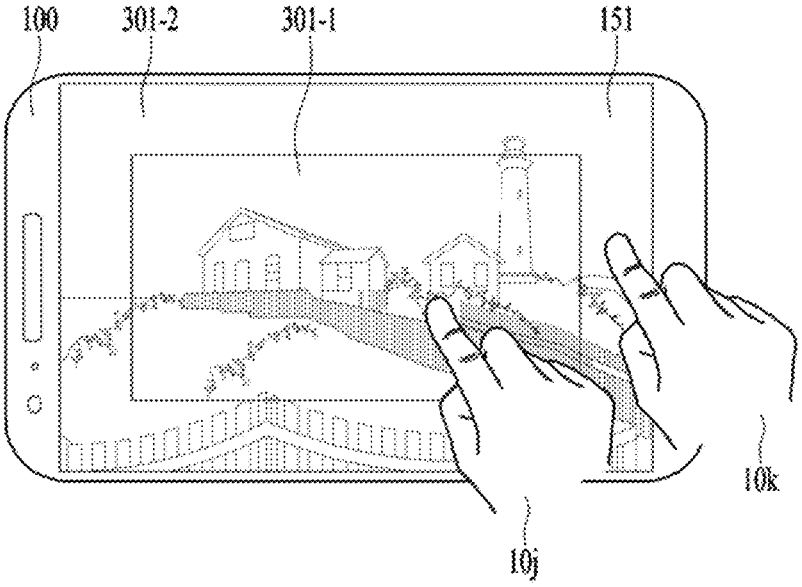

FIGS. 18A and 18B are diagrams for a control method of outputting a normal preview screen and a wide-angle preview screen in a manner of overlapping the normal preview screen and the wide-angle preview screen with each other according to one embodiment of the present invention.

As shown in FIG. 18A, the controller 180 can output a normal preview screen 301-1 of a normal camera. If a wide-angle capturing condition is satisfied, as shown in FIG. 18B, the controller 180 can output a wide-angle preview screen 301-2 together with the normal preview screen 301-1. In this case, the normal preview screen 301-1 and the wide-angle preview screen 301-2 can be outputted in a form of being overlapped with each other.

Moreover, if the normal preview screen 301-1 is touched 10j, the controller 180 can take a picture using a normal camera. If the wide-angle preview screen 301-2 is touched 10k, the controller 180 can take a picture using a wide angle camera. Moreover, if the normal preview screen 301-1 and the wide-angle preview screen 301-2 are touched at the same time, the controller 180 can take a picture using both the normal camera and the wide angle camera.

Figure 19A:
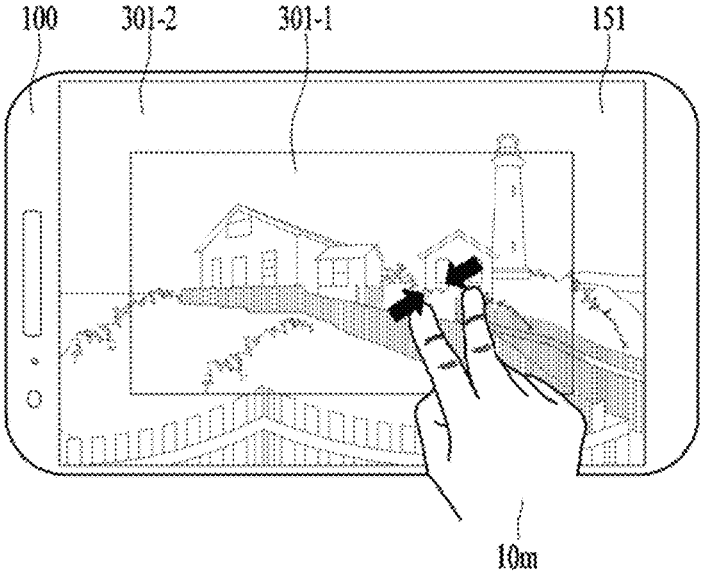
FIGS. 19A and 19B are diagrams for a control method of outputting either a normal preview screen or a wide-angle preview screen according to one embodiment of the present invention when the normal preview screen and the wide-angle preview screen are outputted in a manner of being overlapped with each other.
Figure 19B:
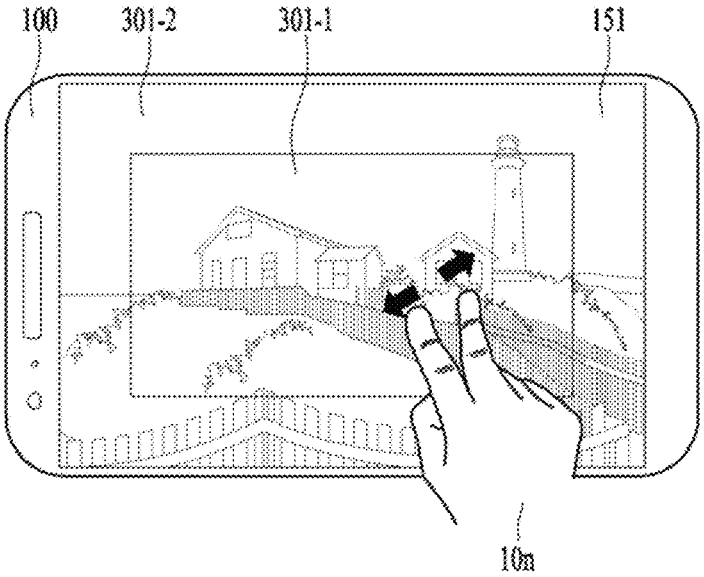

FIGS. 19A and 19B are diagrams for a control method of outputting either a normal preview screen or a wide-angle preview screen according to one embodiment of the present invention when the normal preview screen and the wide-angle preview screen are outputted in a manner of being overlapped with each other.

As shown in FIG. 19A, if a pinch-in gesture 10m is received while the normal preview screen 301-1 and the wide-angle preview screen 301-2 are outputted in a manner of being overlapped with each other, it may be able to output the wide-angle preview screen 301-2 only. If a picture capture command is received in a state that the wide-angle preview screen 301-2 is outputted only, it may be able to take a picture using a wide angle camera.

As shown in FIG. 19B, if a pinch-out gesture 10n is received while the normal preview screen 301-1 and the wide-angle preview screen 301-2 are outputted in a manner of being overlapped with each other, it may be able to output the normal preview screen 301-1 only. If a picture capture command is received in a state that the normal preview screen 301-1 is outputted only, it may be able to take a picture using a normal camera.

Advantageous effects of a mobile terminal according to the present invention and a method of controlling therefor are described in the following.

According to at least one or more embodiments, it is able to provide a best capturing mode to a user in a manner of automatically determining a condition appropriate for capturing a picture with a wide angle.

According to at least one or more embodiments, when a picture is taken by a normal camera, it is able to include a part, which is not included in the picture, in the picture again.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

[1. A mobile terminal, comprising:

a memory;

a touch screen;

a first camera having a first capturing angle;

a second camera having a second capturing angle that is wider than the first capturing angle; and a controller configured to:

cause the touch screen to display a first preview image of the first camera, a second preview image of the second camera, or both the first and second preview images overlapping each other;

measure a distance between the mobile terminal and a subject to be captured via the first or second camera; and in response to a capture command:

capture both a first image taken by the first camera and a second image taken by the second camera when the measured distance is satisfied for a specific distance condition; and capture the first image only when the measured distance is not satisfied for the specific distance condition.]

[2. The mobile terminal of claim 1, wherein the specific condition is satisfied when the measured distance is greater than a prescribed distance.]

[3. The mobile terminal of claim 2, wherein the controller is further configured to:

cause the touch screen to display an image synthesized from the captured first image and second image.]

[4. The mobile terminal of claim 3, wherein the controller is further configured to:

cause the touch screen to display a graphic element to adjust a ratio of the first image to the second image for the synthesized image.]

[5. The mobile terminal of claim 3, wherein the synthesized image is generated by overlapping at least a portion of the second image such that an object in the first image coincides with the same object in the second image.]

[6. The mobile terminal of claim 3, wherein the controller is further configured to:

cause the touch screen to display a preview image synthesized from the first preview image and the second preview image before the first image and the second image are captured when the measured distance is satisfied for the specific distance condition.]

[7. A method for controlling a mobile terminal comprising a touch screen, a first camera having a first capturing angle, and a second camera having a second capturing angle that is wider than the first capturing angle, the method comprising:

displaying, on the touch screen, a first preview image of the first camera, a second preview image of the second camera, or both the first and second preview images overlapping each other;

measuring a distance between the mobile terminal and a subject to be captured via the first or second camera; and in response to a capture command:

capturing both a first image taken by the first camera and a second image taken by the second camera when the measured distance is satisfied for a specific distance condition; and capturing the first image only when the measured distance is not satisfied for the specific distance condition.]

[8. The method of claim 7, wherein the specific condition is satisfied when the measured distance is greater than a prescribed distance.]

[9. The method of claim 8, further comprising:

displaying, on the touch screen, an image synthesized from the captured first image and second image.]

[10. The method of claim 9, further comprising:

displaying, on the the touch screen, a graphic element to adjust a ratio of the first image to the second image for the synthesized image.]

[11. The method of claim 9, wherein the synthesized image is generated by overlapping at least a portion of the second image such that an object in the first image coincides with the same object in the second image.]

[12. The method of claim 9, further comprising:

displaying, on the touch screen, a preview image synthesized from the first preview image and the second preview image before the first image and the second image are captured when the measured distance is satisfied for the specific distance condition.]

*13. A mobile terminal, comprising:*

*a memory;*

*a touch screen;*

*a first camera having a first capturing angle;*

*a second camera having a second capturing angle that is wider than the first capturing angle, wherein the first camera and the second camera are located on one side of the mobile terminal; and*

*a controller configured to:*

*determine a capture mode in response to a user input related to the first capturing angle or the second capturing angle;*

*determine a value related to a distance between the mobile terminal and a subject to be captured via the first or second camera;*

*cause the touch screen to display a first preview image of the first camera, a second preview image of the second camera, or both the first and second preview images overlapping each other based on the distance related value;*

*in response to a capture command:*

*capture both a first image taken by the first camera and a second image taken by the second camera based on the capturing mode being related to the second capturing angle and the distance related value satisfying a distance condition; and*

*capture the first image only based on the capturing mode being related to the first capturing angle and the distance related value not satisfying the distance condition.*

*14. The mobile terminal of claim 13, wherein the distance condition is a minimum distance related condition.*

*15. The mobile terminal of claim 14, wherein the distance condition is satisfied when the distance related value indicates that a distance between the mobile terminal and the main subject is greater than a prescribed distance.*

*16. The mobile terminal of claim 15, wherein the controller is further configured to cause the touch screen to display an image synthesized from the captured first image and second image.*

*17. The mobile terminal of claim 16, wherein the controller is further configured to cause the touch screen to display a graphic element to adjust a ratio of the first image to the second image for the synthesized image.*

*18. The mobile terminal of claim 16, wherein the synthesized image is generated by overlapping the first image and the second image such that an object in the first image coincides with the same object in the second image.*

*19. The mobile terminal of claim 16, wherein the controller is further configured to cause the touch screen to display a preview image synthesized from the first preview image and the second preview image before the first image and the second image are captured based on the capturing mode being related to the second capturing angle and the distance related value satisfying the distance condition.*

*20. A method for controlling a mobile terminal comprising a touch screen, a first camera having a first capturing angle, and a second camera having a second capturing angle that is wider than the first capturing angle, wherein the first camera and the second camera are located on one side of the mobile terminal, the method comprising:*

*determining a capture mode in response to a user input related to the first capturing angle or the second capturing angle;*

*determining a value related to a distance between the mobile terminal and a subject to be captured via the first or second camera;*

*displaying on the touch screen a first preview image of the first camera, a second preview image of the second camera, or both the first and second preview images overlapping each other based on the distance related value;*

*in response to a capture command:*

*capturing both a first image taken by the first camera and a second image taken by the second camera based on the capturing mode being related to the second capturing angle and the distance related value satisfying a distance condition; and*

*capturing the first image only based on the capturing mode being related to the first capturing angle and the distance related value not satisfying the distance condition.*

*21. The method of claim 20, wherein the distance condition is a minimum distance related condition.*

*22. The method of claim 21, wherein the distance condition is satisfied when the distance related value indicates that a distance between the mobile terminal and the main subject is greater than a prescribed distance.*

*23. The method of claim 22, further comprising:*

*displaying, on the touch screen, an image synthesized from the captured first image and second image.*

*24. The method of claim 23, further comprising:*

*displaying, on the touch screen, a graphic element to adjust a ratio of the first image to the second image for the synthesized image.*

*25. The method of claim 23, wherein the synthesized image is generated by overlapping the first image and the second image such that an object in the first image coincides with the same object in the second image.*

*26. The method of claim 23, further comprising:*

*displaying, on the touch screen, a preview image synthesized from the first preview image and the second preview image before the first image and the second image are captured based on the capturing mode being related to the second capturing angle and the distance related value satisfying the distance condition.*

*27. A mobile terminal, comprising:*

*a memory;*

*a touch screen;*

*a first camera having a first capturing angle;*

*a second camera having a second capturing angle that is wider than the first capturing angle, wherein the first camera and the second camera are located on one side of the mobile terminal; and*

*a controller configured to:*

*cause the touch screen to display a first preview image of the first camera including a subject to be captured, a second preview image of the second camera including the subject, or both the first and second preview images overlapping each other and including the subject;*

*determine a value related to a distance between the mobile terminal and the subject to be captured via the first or second camera;*

*in response to a capture command:*

*capture both a first image taken by the first camera and a second image taken by the second camera when the distance related value satisfies a distance condition; and*

*capture the first image only when the distance related value does not satisfy the distance condition; and*

*execute a gallery application.*

*28. The mobile terminal of claim 27, wherein the distance condition is a minimum distance related condition.*

*29. The mobile terminal of claim 28, wherein the distance condition is satisfied when the distance related value indicates that a distance between the mobile terminal and the main subject is greater than a prescribed distance.*

*30. The mobile terminal of claim 29, wherein the controller is further configured to cause the touch screen to display an image synthesized from the captured first image and second image.*

*31. The mobile terminal of claim 30, wherein the controller is further configured to cause the touch screen to display a graphic element to adjust a ratio of the first image to the second image for the synthesized image.*

*32. The mobile terminal of claim 30, wherein the synthesized image is generated by overlapping the first image and the second image such that an object in the first image coincides with the same object in the second image.*

*33. The mobile terminal of claim 30, wherein the controller is further configured to cause the touch screen to display a preview image synthesized from the first preview image and the second preview image before the first image and the second image are captured based on the distance related value satisfying the distance condition.*

* * * * *